US009753231B2

(12) United States Patent
Miura et al.

(10) Patent No.: US 9,753,231 B2
(45) Date of Patent: Sep. 5, 2017

(54) OPTICAL CONNECTOR CLEANING TOOL AND OPTICAL CONNECTOR END FACE OBSERVATION SYSTEM

(71) Applicants: NTT Advanced Technology Corporation, Kanagawa (JP); Nippon Telegraph and Telephone Corporation, Tokyo (JP)

(72) Inventors: Toru Miura, Kanagawa (JP); Masayuki Murakami, Kanagawa (JP); Masaru Kobayashi, Kanagawa (JP); Yuichi Higuchi, Tokyo (JP); Joji Yamaguchi, Tokyo (JP)

(73) Assignees: NTT ADVANCED TECHNOLOGY CORPORATION, Kanagawa (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 156 days.

(21) Appl. No.: 14/642,659

(22) Filed: Mar. 9, 2015

(65) Prior Publication Data

US 2015/0253516 A1 Sep. 10, 2015

(30) Foreign Application Priority Data

Mar. 10, 2014 (JP) ................................. 2014-045945

(51) Int. Cl.
*G02B 6/38* (2006.01)
*G01M 11/00* (2006.01)
(52) U.S. Cl.
CPC ........... *G02B 6/3866* (2013.01); *G01M 11/31* (2013.01)

(58) Field of Classification Search
CPC . G02B 6/3866; G02B 6/3807; G02B 27/0006
See application file for complete search history.

(56) References Cited

U.S. PATENT DOCUMENTS 5,325,452 A * 6/1994 Stein .................... B08B 1/00
385/67
5,724,127 A 3/1998 Csipkes et al.
(Continued)

FOREIGN PATENT DOCUMENTS

JP 04-110907 4/1992
JP 2008-22476 9/2008
(Continued)

*Primary Examiner* — Thomas A Hollweg
*Assistant Examiner* — Mary A El Shammaa
(74) *Attorney, Agent, or Firm* — Blakely Sokoloff Taylor & Zafman LLP

(57) ABSTRACT

An optical connector cleaning tool includes a cylindrical connecting portion to which an optical connector is connected, a cleaning unit configured to guide a cleaning thread to a coupling end face of an optical connector plug, and an optical unit having an optical path reaching the optical connector plug. The optical unit includes a lens arranged in a position facing the coupling end face to form one end portion of an optical system, and having a missing portion extending in an optical-axis direction, and an image sensor positioned at the other end of the optical system. The cleaning unit includes a rod-like cleaning tip having a thread passage through which the cleaning thread passes. The cleaning tip is inserted into a hollow portion of the lens having the missing portion extending in the optical-axis direction, such that the cleaning tip is movable in a longitudinal direction thereof.

27 Claims, 18 Drawing Sheets

(56) References Cited

U.S. PATENT DOCUMENTS

| | | | | |
|---|---|---|---|---|
| 5,768,738 A | * | 6/1998 | Lee | B08B 1/00 15/210.1 |
| 2003/0221710 A1 | * | 12/2003 | Young | B08B 1/00 134/22.14 |
| 2010/0043159 A1 | * | 2/2010 | Fujiwara | B08B 1/00 15/97.1 |
| 2011/0047731 A1 | * | 3/2011 | Sugita | G02B 6/3807 15/97.1 |
| 2011/0154599 A1 | * | 6/2011 | Nakane | B08B 1/04 15/210.1 |
| 2014/0259481 A1 | * | 9/2014 | Fujiwara | G02B 6/3866 15/103.5 |

FOREIGN PATENT DOCUMENTS

| | | |
|---|---|---|
| JP | 2015-010850 | 1/2015 |
| JP | 2015-010851 | 1/2015 |
| JP | 2015117949 | 6/2015 |
| WO | WO-2008072822 A1 | 6/2008 |
| WO | WO 2009/119437 A1 | 10/2009 |
| WO | WO-2015093470 | 6/2015 |

* cited by examiner

- - Prior Art - -

- - Prior Art - -

— # OPTICAL CONNECTOR CLEANING TOOL AND OPTICAL CONNECTOR END FACE OBSERVATION SYSTEM

BACKGROUND OF THE INVENTION

The present invention relates to an optical connector cleaning tool which is used to clean the coupling end face of an optical connector, and an optical connector end face observation system including this optical connector cleaning tool.

An optical connector 200 (see FIGS. 31A and 31B) is used to simply and precisely couple optical fibers in optical communication. As shown in FIGS. 31A and 31B, the optical connector 200 includes plugs 201 and adaptors 202. As shown in FIG. 31B, the optical connector 200 is used in a state in which the plugs 201 oppose each other with the adaptors 202 being interposed between them. If contamination such as oil or dust adheres to a coupling end face (a connecting end face of an optical fiber) 203 of the plug 201 of the optical connector 200 of this kind, a loss or reflection of optical signal on the coupling end face increases, and this may pose a problem in transmission of an optical signal. Accordingly, the coupling end face 203 must be clean, and is in many cases cleaned by wiping using an optical connector cleaning tool.

A conventional optical connector cleaning tool is described in, e.g., WO2009/119437 (literature 1). In this optical connector cleaning tool disclosed in literature 1, a cleaning thread is pressed against the coupling end face and wound while being rotated.

After cleaning an optical connector by using this cleaning tool, a cleaning worker removes the cleaning tool from the optical connector, connects an observation tool, and checks the cleaning state of the coupling end face by using this observation tool. If contamination remains on the coupling end face, the worker removes the observation tool from the optical connector, connects the cleaning tool, and performs cleaning again.

The conventional optical connector cleaning tool requires the use of the observation tool as a separate unit of the cleaning tool before or after cleaning, and this complicates the cleaning work. Also, contamination sometimes adheres to the once cleaned end face when using the observation tool, and this causes waste in work.

SUMMARY OF THE INVENTION

The present invention has been made to eliminate the above problems, and has as its object to provide an optical connector cleaning tool capable of checking the state of the coupling end face of an optical connector.

To achieve the above object, an optical connector cleaning tool according to the present invention includes a cylindrical connecting portion to which an optical connector is connected, a cleaning unit configured to guide a cleaning thread to a coupling end face of an optical connector plug, and an optical unit having an optical path reaching the optical connector plug, wherein the optical unit includes a lens arranged in a position facing the coupling end face to form one end portion of an optical system, and having a missing portion extending in an optical-axis direction, and an image sensor positioned at the other end of the optical system, and a rod-like cleaning tip having a thread passage through which the cleaning thread passes is inserted into a hollow portion of the lens having the missing portion extending in the optical-axis direction, such that the cleaning tip is movable in the longitudinal direction thereof.

DESCRIPTION OF THE PREFERRED EMBODIMENTS

Figure 31A:
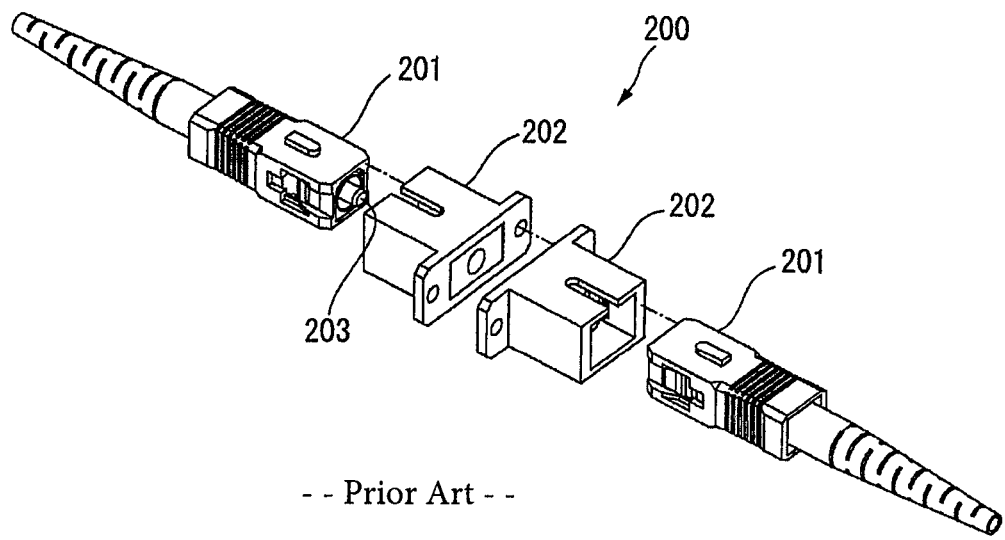
FIG. 31A is an exploded perspective view showing the arrangement of an optical connector.
Figure 31B:
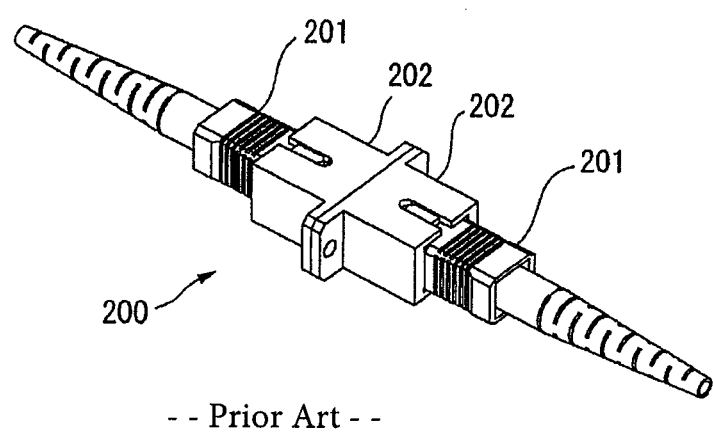
FIG. 31B is a perspective view showing a state in which optical connector plugs and adaptors are used.

An embodiment of an optical connector cleaning tool and optical connector end face observation system according to the present invention will be explained in detail below with reference to FIGS. 1 to 12. In this embodiment, an example of the case in which the optical connector plug 201 shown in FIGS. 31A and 31B described above will be explained.

Figure 1:
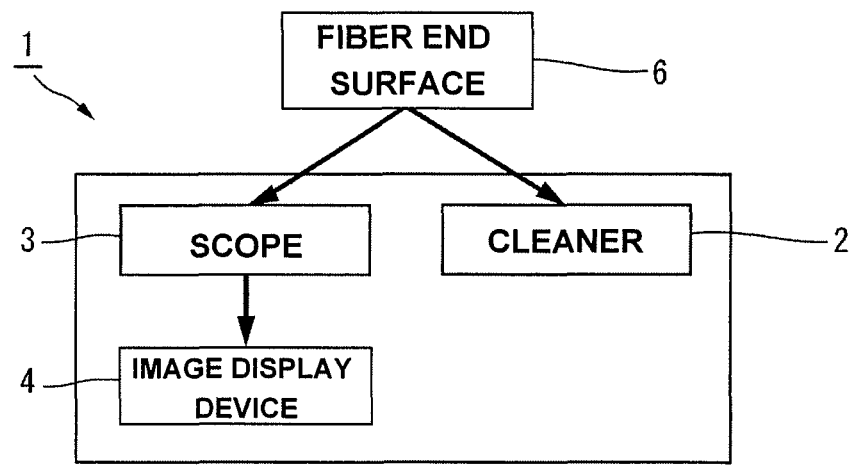
FIG. 1 is a block diagram showing the configuration of an optical connector end face observation system.

An optical connector end face observation system 1 shown in FIG. 1 includes a cleaner 2 (to be described later), a scope 3, and an image display device 4. The cleaner 2 cleans a coupling end face 203 (fiber end face 6) of the optical connector plug 201 (see FIGS. 31A and 31B), and the structure will be described in detail later. The scope 3 captures an image of the coupling end face 203, thereby generating the image of the coupling end face 203. The image display device 4 displays the image generated by the scope 3.

Figure 2:
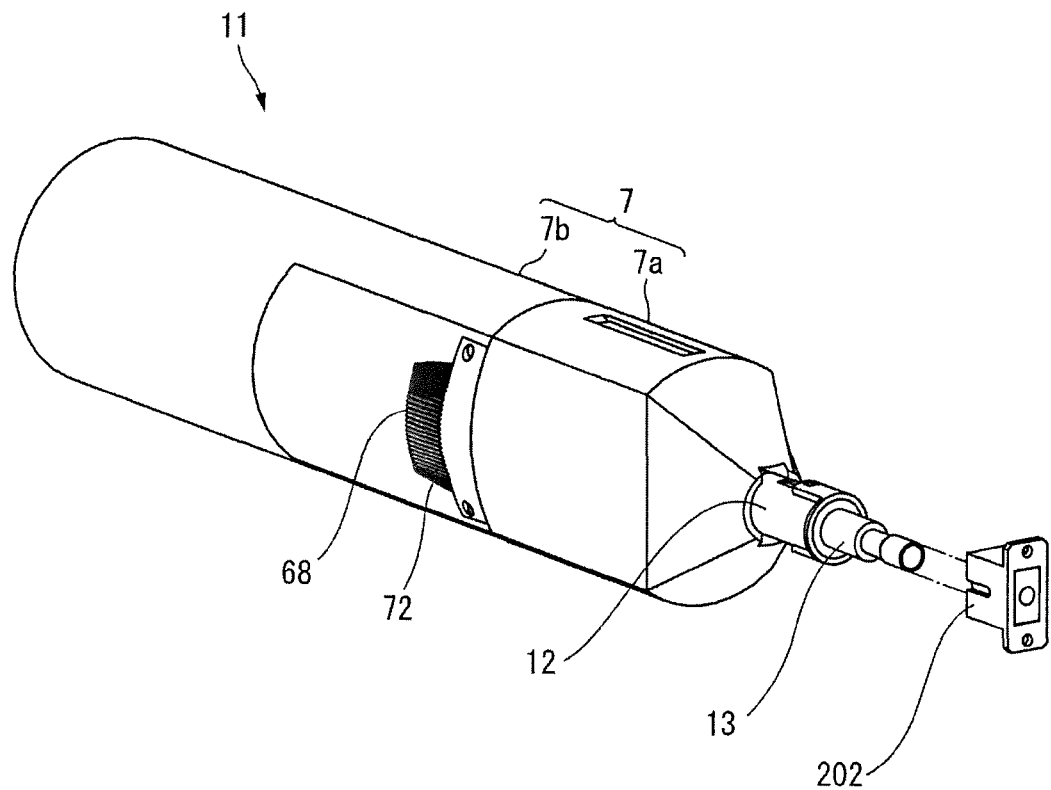
FIG. 2 is a perspective view of an optical connector cleaning tool.

The cleaner 2 and scope 3 according to this embodiment forms one optical connector cleaning tool 11 when assembled in a case 7 shown in FIG. 2. The image display device 4 is connected to the optical connector cleaning tool 11 by a cable (not shown).

A worker (not shown) holds the case 7 in his or her hand. A first cylinder 12 of the cleaner 2 (to be described later) projects from one end portion of the case 7. A cylindrical member 13 for connecting the adaptor 202 of the optical connector 200 is attached to the distal end portion of the first cylinder 12.

Figure 3:
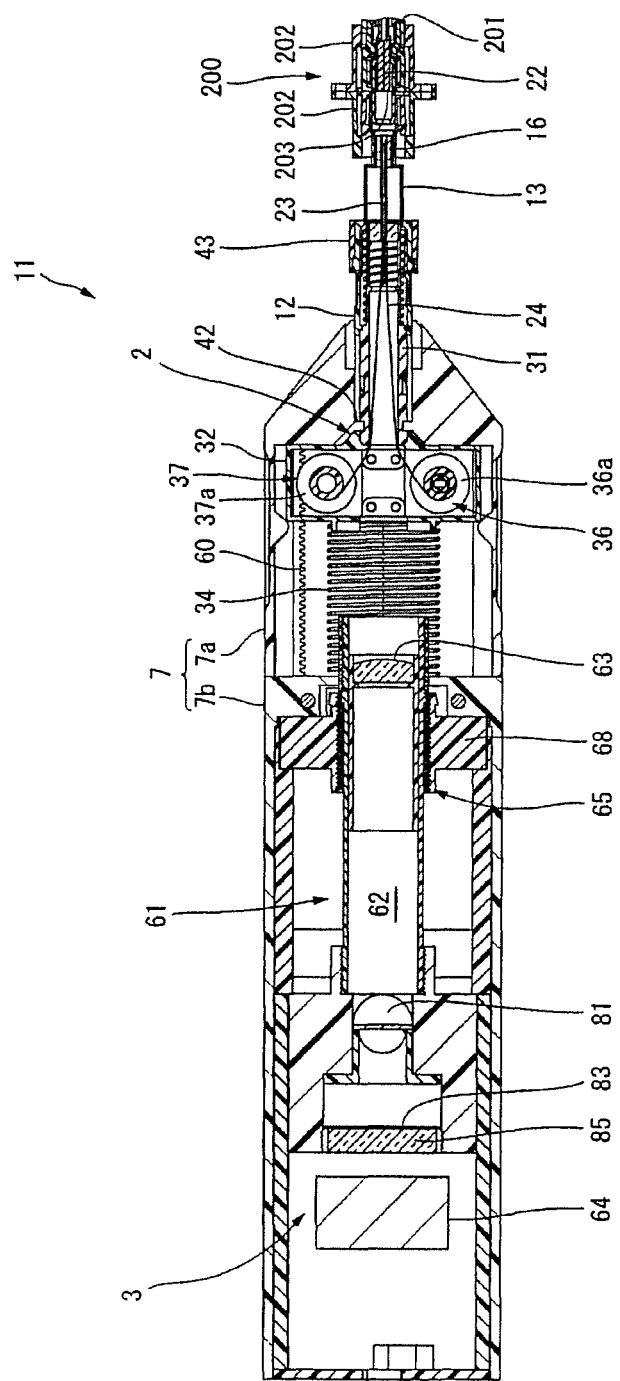
FIG. 3 is a sectional view showing the whole of the optical connector cleaning tool.

As shown in FIG. 3, the case 7 according to this embodiment can be split into a first unit (to be referred to as "a front half portion" hereinafter) 7a positioned on one-end side to which the first cylinder 12 projects, and a second unit (to be referred to as "a rear half portion" hereinafter) 7b positioned in an other-end side. In this embodiment, a direction from the case 7 to the adaptor 202 is "forward", and the opposite direction is "backward". Also, when a component of the optical connector cleaning tool 11 moves forward, this will be called "advance". When a component of the optical connector cleaning tool 11 moves backward, this will be called "retreat".

In this embodiment, an example of a case in which the adaptor 202 is attached to the optical connector plug 201 as a cleaning target and opposed to the adaptor 202 to which the cylindrical member 13 is attached will be explained. In this embodiment, the cylindrical portion 13 is equivalent to "a connecting portion" in the present invention.

Figure 4:
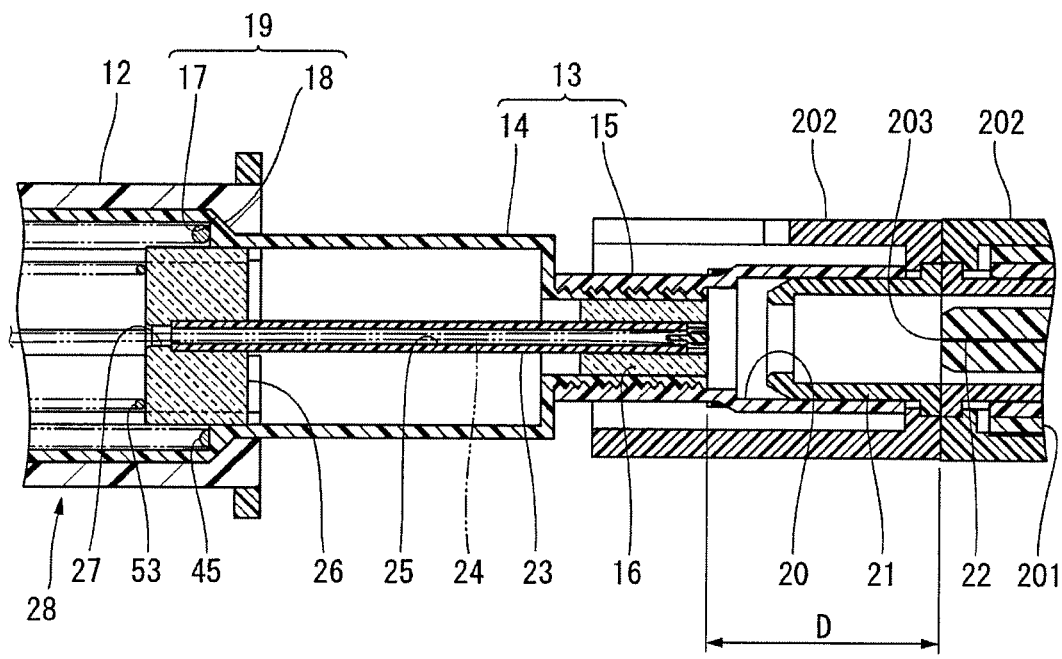
FIG. 4 is a sectional view showing the front end portion of the optical connector cleaning tool in an enlarged scale in a state in which an optical connector is connected.
Figure 5:
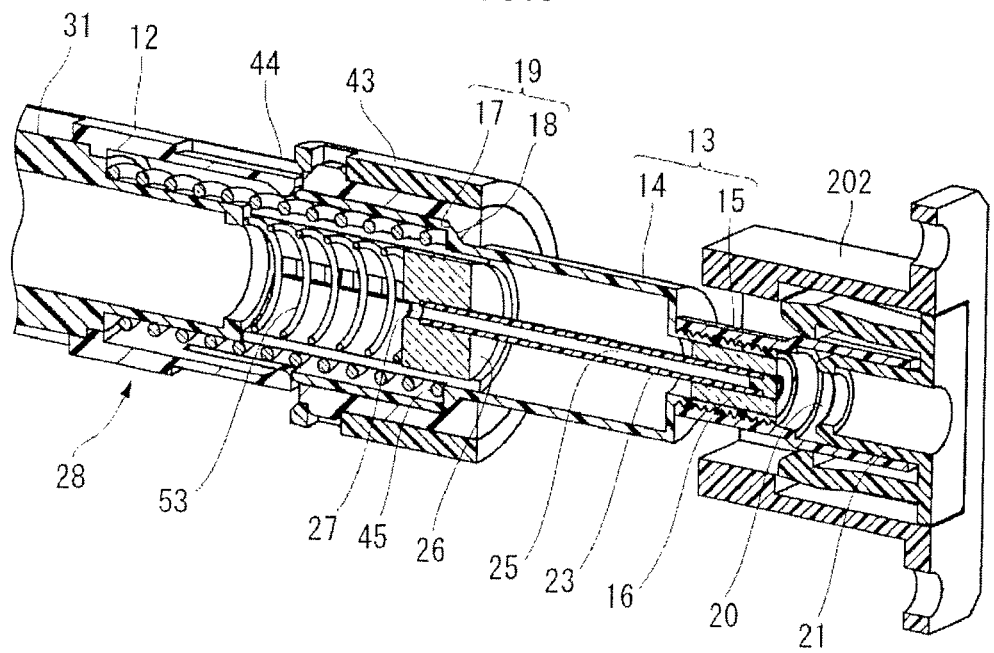
FIG. 5 is a perspective sectional view showing the front end portion of the optical connector cleaning tool in an enlarged scale.

As shown in FIGS. 4 and 5, the cylindrical member 13 is formed by combining two cylindrical members, and fitted in the first cylinder 12 (to be described later) so as to be movable in the axial direction. The two cylindrical members are a proximal-end member 14 to be attached to the first cylinder 12, and a distal-end member 15 to which the adaptor 202 is connected. A ring lens 16, which is formed into an annular shape having a concentric hole along its optical axis, is fixed in an inner-circumferential portion of the proximal-end member 14 according to this embodiment. The ring lens 16 forms the front end portion of the scope 3 (to be described later). The distal-end member 15 matches the adaptor 202 of the optical connector 200 to be cleaned.

A second tapered surface 18 which fits on a first tapered surface 17 of the first cylinder 12 is formed on an outer-circumferential portion of the cylindrical member 13 (the proximal-end member 14). The first and second tapered surfaces 17 and 18 are so formed as to gradually decrease their diameters forward. When the second tapered surface 18 of the cylindrical member 13 is fitted on the first tapered surface 17 of the first cylinder 12, the cylindrical member 13 is positioned on the same axis as that of the first cylinder 12. That is, the cylindrical member 13 and first cylinder 12 are connected by a first fitting structure 19 including the pair of tapered surfaces 17 and 18.

A hole 20 in which the adaptor 202 is fitted is formed in the distal end portion of the cylindrical member 13. The adaptor 202 has a cylinder 21 which fits in the hole 20 of the cylindrical member 13. An optical fiber 22 of the optical connector plug 201 is exposed to a hollow portion of the cylinder 21. The distal end face of the optical fiber 22 is the coupling end face 203 of the optical connector plug 201.

The ring lens 16 fixed on the core of the cylindrical member 13 is positioned on the same axis as that of the cylindrical member 13. As shown in FIG. 4, the ring lens 16 is arranged in a position at which a distance D to the distal end face of the adaptor 202 attached to the cylindrical member 13 is a predetermined distance.

A rod-like cleaning tip 23 is fitted in a hollow portion of the ring lens 16 so as to be movable in the longitudinal direction. The ring lens 16 according to this embodiment functions as a guide when the cleaning tip 23 moves in the longitudinal direction.

As shown in FIG. 4, a thread passage 25 through which a cleaning thread 24 passes is formed inside the cleaning tip 23. Note that the structure of the cleaning tip 23 is not limited to a pipe-like structure obtained by forming a hole in a columnar pillar as presented in this embodiment. The structure of the cleaning tip 23 can be any structure as long as the structure can guide the cleaning thread 24.

The cleaning thread 24 is inserted into the thread passage 25 from the rear end of the cleaning tip 23, and extended through the cleaning tip 23 in the longitudinal direction. Also, the cleaning thread 24 is returned from the front end of the cleaning tip 23, inserted into the thread passage 25 again, and guided backward from the rear end of the cleaning tip 23. The rear end portion of the cleaning tip 23 is fixed to a transparent member 26. The cleaning tip 23 is supported by the transparent member 26. In this embodiment, the transparent member 26 is equivalent to "a support member" of the invention described in claim 3. A through hole 27 for inserting the cleaning thread 24 is formed in the core of the transparent member 26. In addition, a pressing mechanism 28 is connected to the transparent member 26 as will be described in detail later. The pressing mechanism 28 has a function of biasing the cleaning tip 23 toward the optical connector plug 201 and rotating the cleaning tip 23.

This function is implemented by a second cylinder 31 (to be described later) accommodated in the first cylinder 12, and a compression spring 53 placed inside the second cylinder 31.

The cleaner 2 has a function of pressing the cleaning thread 24 against the optical connector plug 201, a function of rotating the cleaning thread 24, and a function of feeding the cleaning thread 24. In this embodiment, the cleaner 2 is equivalent to "a cleaning unit" of the present invention.

The arrangement of the cleaner 2 will be explained in detail below with reference to FIGS. 6 to 9B. The cleaner 2 is formed by using, e.g., the first cylinder 12, the second cylinder 31 formed inside the first cylinder 12, and the transparent member 26 formed in the second cylinder 31.

Figure 6:
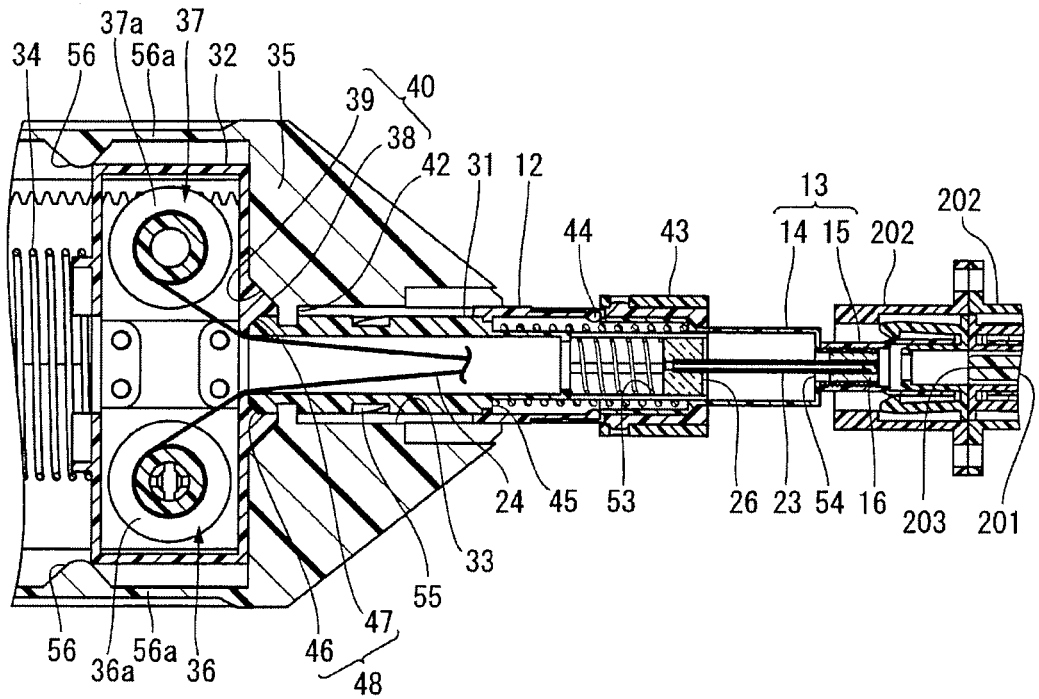
FIG. 6 is a sectional view showing a cleaner portion of the optical connector cleaning tool in a state before cleaning.
Figure 7:
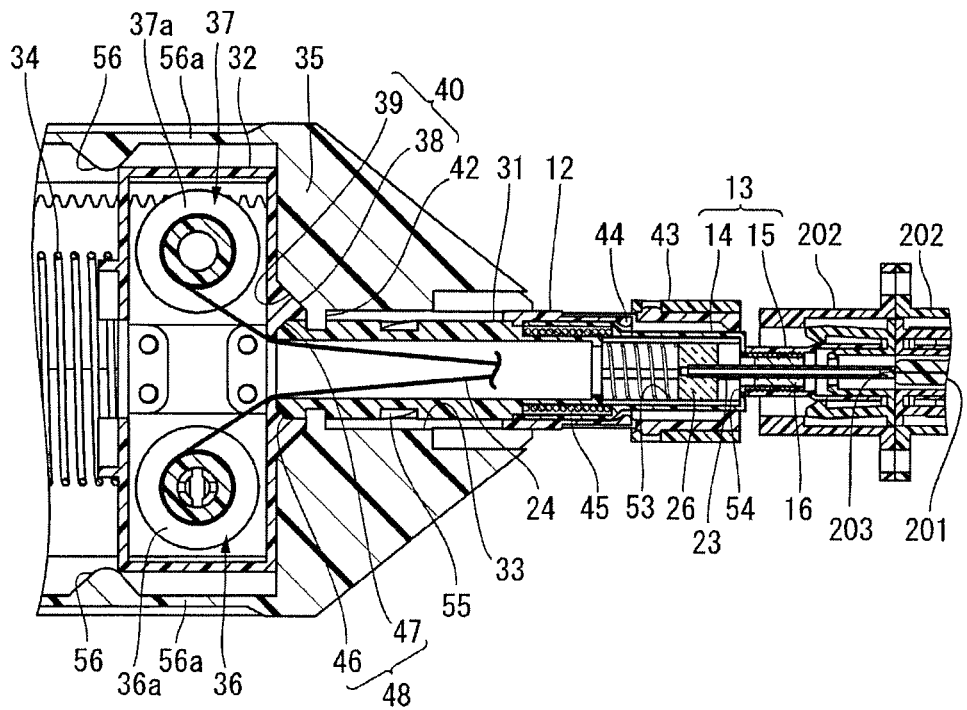
FIG. 7 is a sectional view showing the cleaner portion of the optical connector cleaning tool in a state in which the forward movement of a second cylinder is regulated.

As shown in FIGS. 6 and 7, the first cylinder 12 is integrated with a housing 32. The first cylinder 12 is inserted into a through hole 33 of the case 7, and movably supported by the case 7. The housing 32 is movably accommodated in the case 7, and pressed against a front wall 35 of the case 7 by a first compression spring 34 placed in the case 7. The first compression spring 34 is inserted as it is compressed between the rear half portion 7b of the case 7 and the housing 32. The housing 32 accommodates a supply mechanism 36 for supplying the cleaning thread 24, and a winding mechanism 37 for winding the cleaning thread 24.

A third tapered surface 38 which gradually decreases the diameter forward is formed in a portion of the first cylinder 12, which is the boundary with respect to the housing 32. The third tapered surface 38 is formed into a shape which fits on a fourth tapered surface 39 formed on the case 7. When the third tapered surface 38 is fitted on the fourth tapered surface 39, the first cylinder 12 and case 7 are positioned on the same axis. That is, the first cylinder 12 and case 7 are connected by a second fitting structure 40 including the pair of tapered surfaces 38 and 39.

Figure 8:
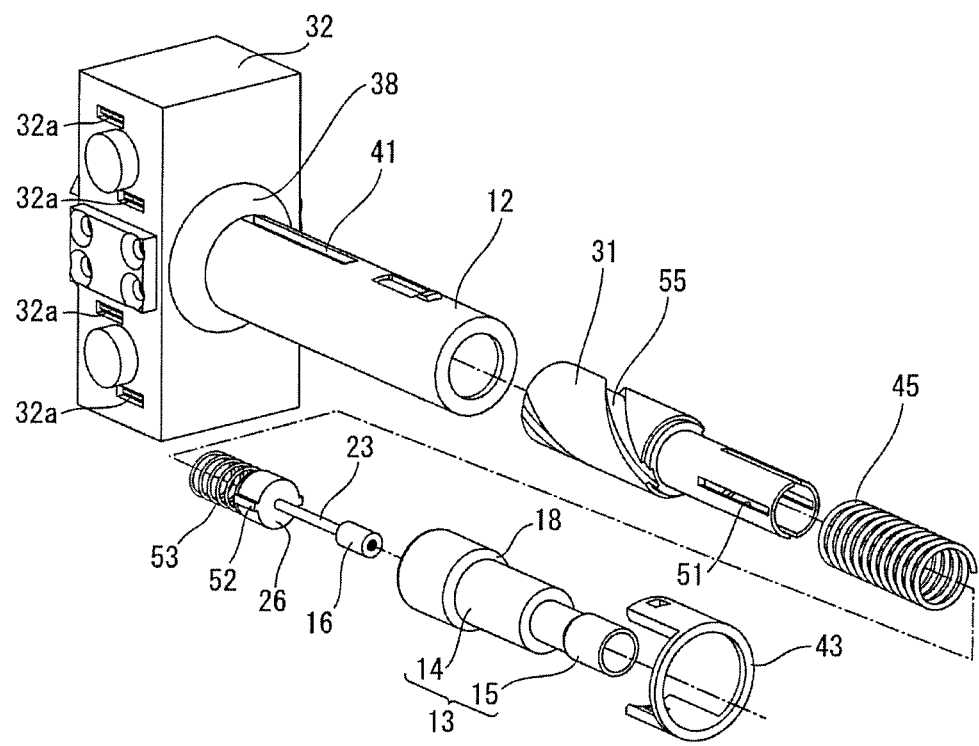
FIG. 8 is an exploded perspective view of the cleaner portion of the optical connector cleaning tool.

As shown in FIG. 8, a slit 41 extending in the longitudinal direction is formed in the rear portion of the first cylinder 12. A cam follower 42 (see FIG. 3) of the case 7 is inserted into the slit 41. That is, the first cylinder 12 is supported by the case 7 so as to be movable back and forth, in a state in which the rotation with respect to the case 7 is regulated by the cam follower 42.

The above-described cylindrical member 13 is movably fitted in the inner circumferential portion of the front end portion of the first cylinder 12. Also, a connecting member 43 is attached to the outer circumferential portion of this front end portion. The connecting member 43 is used to assemble the first cylinder 12 and housing 32 which are separately formed.

In addition, a projection 44 is formed on the front end portion of the first cylinder 12 in order to ensure a focal length by preventing the first cylinder 12 from advancing. The projection 44 is formed into a cantilever shape. When the first cylinder 12 moves toward the cylindrical member 13, the projection 44 is displaced outside the cylindrical member 13 by abutting against the cylindrical member 13, and advances in slidable contact with the outer circumferential surface of the cylindrical member 13.

The second cylinder 31 is rotatably supported on the inner circumferential surface of the first cylinder 12. The second cylinder 31 cannot move back and forth with respect to the first cylinder 12. A second compression spring 45 is inserted in a compressed state between an axial-direction intermediate portion of the second cylinder 31 and the cylindrical member 13. The spring force of the second compression coil spring 45 is smaller than that of the above-described first compression coil spring 34. The spring force of the second compression coil spring 45 presses the cylindrical member 13 against the first cylinder 12 via the first fitting structure 19. That is, when the case 7 is pushed forward while the adaptor 202 is attached to the cylindrical member 13, the first and second cylinders 12 and 31 advance toward the cylindrical member 13 against the spring force of the second compression coil spring 45.

A fifth tapered surface 46 which gradually decreases the diameter backward is formed in the rear end portion of the second cylinder 31. The fifth tapered surface 46 is formed into a shape which fits on a sixth tapered surface 47 formed on the rear end portion of the first cylinder 12. That is, the first and second cylinders 12 and 31 are connected by a third fitting structure 48 including the pair of tapered surfaces 46 and 47. Consequently, the second cylinder 31 is pushed backward against the housing 32 by the spring force of the second compression coil spring 45, and positioned on the same axis as that of the first cylinder 12.

The above-described transparent member 26 is supported by the front end portion of the second cylinder 31 so as to be movable back and forth. As shown in FIG. 8, slits 51 are formed in the front end portion of the second cylinder 31. Projections 52 which fit in the slits 51 are formed on the outer circumferential portion of the transparent member 26. That is, the transparent member 26 rotates together with the second cylinder 31. A third compression coil spring 53 is inserted between the transparent member 26 and second cylinder 31. The spring force of the third compression coil spring 53 is smaller than that of the above-described second compression coil spring 45. The third compression coil spring 53 is compressed when the transparent member 26 moves backward with respect to the second cylinder 31.

That is, while the first and second cylinders 12 and 31 advance toward the cylindrical member 13, the front end of the cleaning tip 23 abuts against the coupling end face 203 of the optical connector plug 201, and a further forward movement of the transparent member 26 is regulated, so the third compression coil spring 53 is compressed. In this state, the cleaning thread 24 exposed to the front end of the cleaning tip 23 is pressed against the coupling end face 203 by the spring force of the third compression coil spring 53. As shown in FIG. 7, the second cylinder 31 advances until its front end abuts against an inner end face 54 of the cylindrical member 13. In this embodiment, the third compression coil spring 53 is equivalent to "a spring member" of the invention described in claim 8.

As shown in FIG. 8, a spiral cam groove 55 is formed in the rear portion of the second cylinder 31. The cam follower 42 having passed through the slit 41 of the first cylinder 12 is engaged with the cam groove 55. That is, when the case 7 moves back and forth with respect to the first and second cylinders 12 and 31, the second cylinder 31 rotates in one direction or the other together with the transparent member 26, cleaning tip 23 and cleaning thread 24. When the second cylinder 31 thus rotates in a state in which the cleaning thread 24 is in contact with the coupling end face 203, the coupling end face 203 is wiped and cleaned by the cleaning thread 24.

As shown in FIG. 7, the second cylinder 31 rotates when the case 7 is advanced with respect to the first and second cylinders 12 and 31 by the worker in a state in which the second cylinder 31 is abutting against the cylindrical member 13. In this state, the case 7 advances with respect to the first and second cylinders 12 and 31, thereby rotating the second cylinder 31. The second cylinder 31 rotates about 180° when the case 7 moves from the initial position shown in FIG. 6 to an advance position at which the cam follower 42 abuts against the front end of the cum groove 55. Also, the second cylinder 31 rotates about 180° in the opposite direction when the case 7 returns from the advance position to the initial position.

In this embodiment, the first and second cylinders 12 and 31, the second and third compression coil springs 45 and 53, and the like form the pressing mechanism 28.

As shown in FIG. 6, the housing 32 is held as it is sandwiched between the front wall 35 of the case 7 and a pair of projections 56. The pair of projections 56 are formed on thin-wall portions 56a where the rigidity of the case 7 is relatively low. When the case 7 advances with respect to the first and second cylinders 12 and 31 and housing 32 during cleaning, the housing 32 pushes the projections 56 aside and retreats with respect to the case 7. In this state, the case 7 advances against the spring force of the first compression coil spring 34.

The supply mechanism 36 accommodated in the housing 32 uses a supply bobbin 36a in order to supply the cleaning thread 24. Also, the winding mechanism 37 uses a winding bobbin 37a in order to wind the cleaning thread 24. The bobbins 36a and 37a are supported by the housing 32. The axes of the bobbins 36a and 37a are perpendicular to the axis of the first cylinder 12. In addition, as shown in FIG. 3, the bobbins 36a and 37a are formed in positions on the two sides of the axis of the first cylinder 12, and in the same position in the axial direction of the first cylinder 12.

A large number of recessed grooves 57 to be engaged with pawl spring pieces 32a of the housing 32 (see FIGS. 8 and 9B) are formed in one end portion of the winding bobbin 37a in the axial direction. The pawl spring pieces 32a and recessed grooves 57 prevent the reverse rotation of the winding bobbin 37a.

Pawls 58a of a pawl-type, one-way clutch 58 for regulating the rotational direction and a pinion gear 59 having pawls 58b (see FIG. 9B) of the one-way clutch 58 are formed in the other end portion of the winding bobbin 37a in the axial direction.

The pinion gear 59 meshes with a rack 60 formed in the case 7. The rack 60 looks independent in FIG. 9A, but it is actually integrated with the front half portion 7a of the case 7.

Figure 9A:
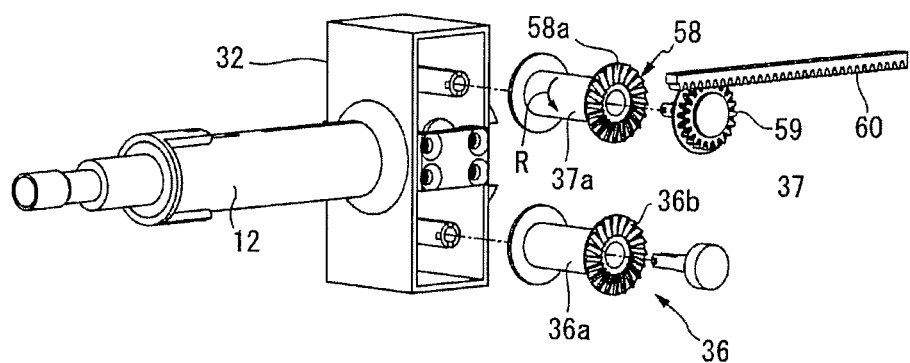
FIG. 9A is an exploded perspective view of a housing portion of the cleaner portion of the optical connector cleaning tool.
Figure 9B:
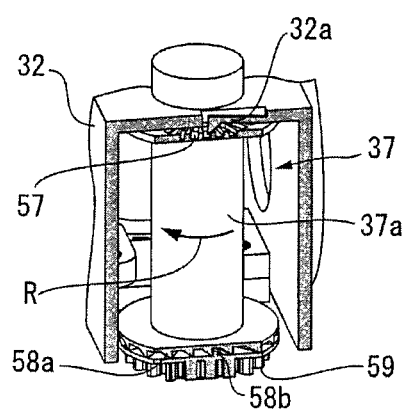
FIG. 9B is a partially cutaway perspective sectional view showing the housing and a supply bobbin of the cleaner portion of the optical connector cleaning tool.

The one-way clutch 58 regulates the rotational direction of the winding bobbin 37a in only a direction in which the cleaning thread 24 is wound. When the rack 60 moves to the left (forward) in FIG. 9A, the pinion gear 59 rotates counterclockwise in FIG. 9A. The one-way clutch 58 transmits this counterclockwise rotation to the supply bobbin 37a. In FIGS. 9A and 9B, an arrow R indicates the rotational direction when the supply bobbin 37a rotates in the forward direction (winding direction). When the supply bobbin 37a rotates in the forward direction, the pawl spring pieces 32a elastically deform and climb over projecting portions formed between the recessed grooves 57.

On the other hand, when the rack 60 moves to the right (backward) in FIG. 9A, the pinion gear 59 rotates in the reverse direction, and the pawls 58b of the pinion gear 59 climb over the pawls 58a formed on the supply bobbin 37a. In this state, the supply bobbin 37a slightly moves in the axial direction while elastically deforming the pawl spring pieces 32a, by a thrust generated in the axial direction when the pawls 58a climb over the pawls 58b.

That is, the winding bobbin 37a rotates in the above-described forward direction when the case 7 advances with respect to the housing 32 and the rack 60 rotates the pinion gear 59. The cleaning thread 24 is wound around the winding bobbin 37a when the winding bobbin 37a thus rotates. When wound around the winding bobbin 37a, the cleaning thread 24 is pulled out from the supply bobbin 36a and moved in the cleaning tip 23. That is, when cleaning the optical connector plug 201, a new cleaning thread 24 in rotation is always pressed against the coupling end face 203 of the optical connector plug 201.

The supply bobbin 36a is identical to the winding bobbin 37a in order use common parts. Therefore, a large number of projections (not shown) with which the pawl spring pieces 32a of the housing 32 engage are formed on one end portion of the supply bobbin 36a in the axial direction, and pawls 36b are formed in the other end portion. Since the pawl spring pieces 32a and projections engage with each other, the supply bobbin 36b rotates in only the direction in which the cleaning thread 24 is pulled out.

When the case 7 returns from the advance position to the initial position, therefore, the supply bobbin 36a and winding bobbin 37a do not rotate, so the cleaning thread 24 does not slacken.

The scope 3 formed in the optical connector cleaning tool 11 generates an image of the coupling end face 203 by using an optical unit 61 (see FIGS. 10 and 11) formed in the case 7.

The optical unit 61 has an optical path 62 extending from the rear end portion of the case 7 to the optical connector plug 201, and forms a confocal optical system. This confocal optical system has one end portion (a front end portion) formed by the above-described ring lens 16, and the other end portion (a rear end portion) formed by an image formation lens 63 formed inside the case 7. The distance D between the ring lens 16 and the coupling end face 203 of the optical connector plug 201 is equivalent to the focal length of one end portion (the front end portion) of the confocal optical system.

An image sensor 64 is formed in the rear end of the confocal optical system. The image sensor 64 captures an image of the coupling end face 203 via the optical unit 61, thereby generating the image of the coupling end face 203. The image sensor 64 is fixed to the rear half portion 7b of the case 7. The image sensor 64 can be formed by using, e.g., a CCD or CMOS. The distance between the image sensor 64 and image formation lens 63 is equivalent to the focal length of the rear end portion of the confocal optical system.

The image formation lens 63 is positioned between the ring lens 16 and image sensor 64, and supported by the rear half portion 7b of the case 7 via a slide mechanism 65 (to be described later) so as to be movable back and forth. The supply bobbin 36a and winding bobbin 37a described above are arranged between the ring lens 16 and image formation lens 63 and adjacent to the optical path 62 in the longitudinal direction of the optical path 62. Accordingly, the cleaning thread 24 crosses the optical path 62 of the scope 3. However, the optical path 62 is not blocked by either the supply bobbin 36a or the winding bobbin 37a.

Figure 12:
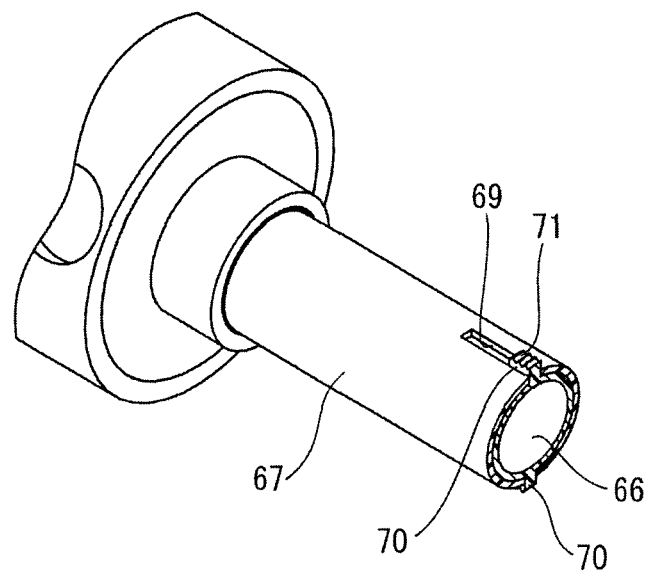
FIG. 12 is a sectional view for explaining a slide mechanism.

The slide mechanism 65 includes, e.g., an inner cylinder 66 in which the image formation lens 63 is fixed, an outer cylinder 67 in which the inner cylinder 66 is movably fitted, and an operation ring 68 which applies a thrust to the inner cylinder 66. As shown in FIG. 12, connecting pieces 70 projecting outside in the radial direction through slits 69 of the outer cylinder 67 are formed on the outer circumferential portion of the inner cylinder 66. A male thread 71 is formed on the distal end portion of each connecting piece 70.

The end portion of the outer cylinder 67 is supported by the rear half portion 7b of the case 7 such that the outer cylinder 67 cannot move.

The operation ring 68 is rotatably supported by the outer cylinder 67 so as not to move in the axial direction. A portion of the outer circumferential portion of the operation ring 68 projects outside the case 7 through an opening 72 in the case 7. The worker rotates the operation ring 68 by using this projecting portion.

A cylinder 73 is formed on the inner circumferential portion of the operation ring 68. The outer cylinder 67 is inserted into the cylinder 73. A female thread 74 is formed on the inner circumferential portion of the cylinder 73. The male threads 71 of the above-described connecting pieces 70 are threadably engaged with the female thread 74. When the operation ring 68 rotates with respect to the case 7, therefore, the female thread 74 of the cylinder 73 pushes the connecting pieces 70 forward or backward by the screw action. The image formation lens 63 moves back and forth together with the inner cylinder 66 by this thread force.

Figure 10:
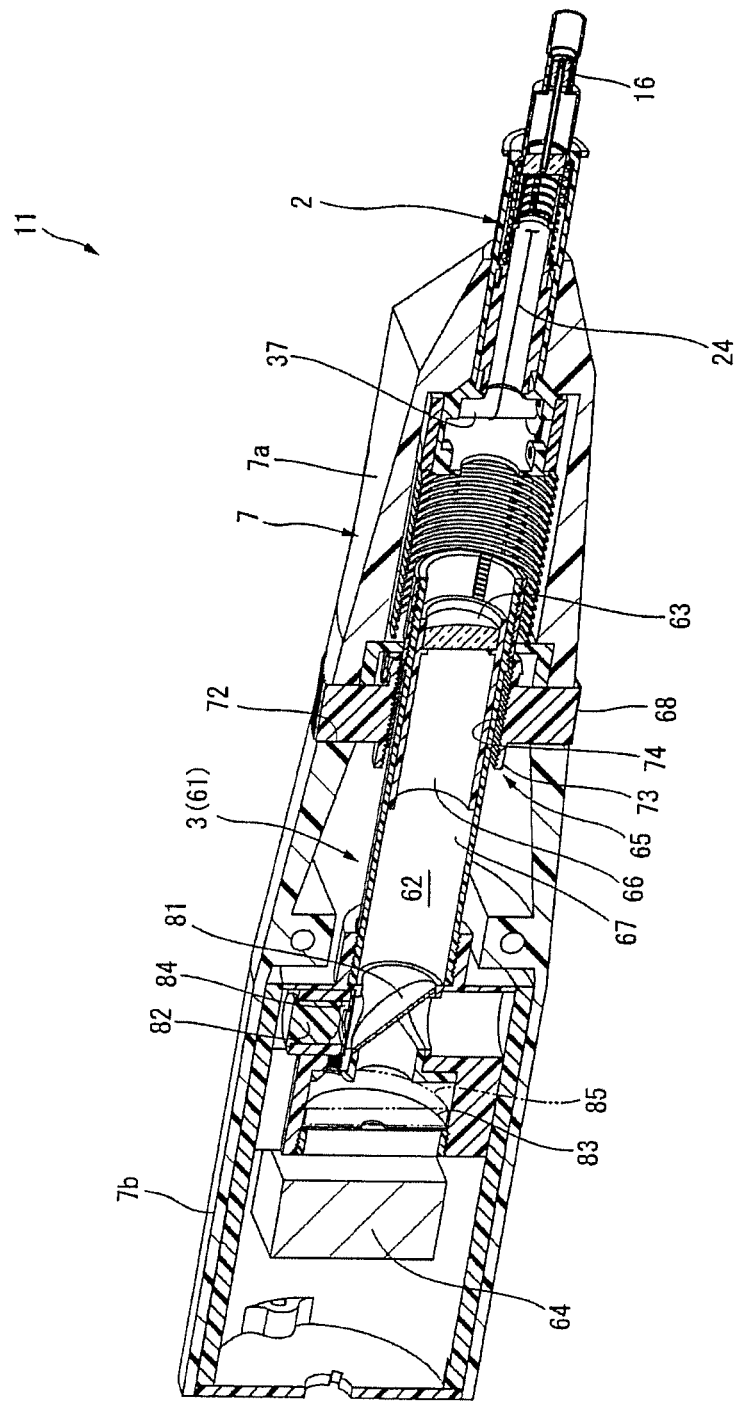
FIG. 10 is a perspective sectional view showing the whole of the optical connector cleaning tool.
Figure 11:
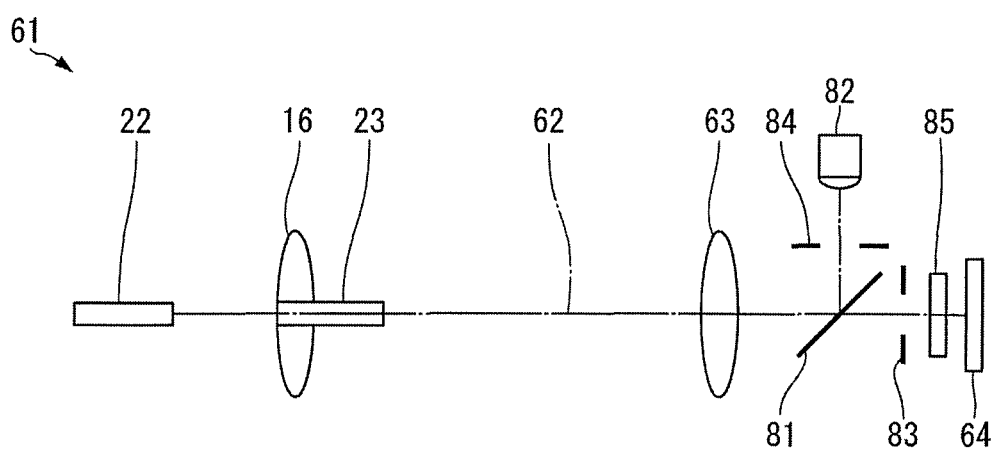
FIG. 11 is a side view showing the arrangement of an optical unit.

As shown in FIGS. 10 and 11, a half mirror 81 and an LED light source 82 are arranged on the optical path 62 of the optical unit 61 and in the vicinity of the image sensor 64. The half mirror 81 according to this embodiment is formed by a parallel-plate beam splitter. The light source 82 is placed in a position close to the half mirror 81 and spaced apart from it in a direction perpendicular to the extending direction of the optical path 62.

The half mirror 81 guides light from the light source 82 to the optical connector plug 201, and guides light from the optical connector plug 201 to the image sensor 64. The light source 82 and image sensor 64 are arranged in conjugate positions in the confocal optical system with respect to the ring lens 16. That is, the distance between the half mirror 81 and image sensor 64 and that between the half mirror 81 and light source 82 are equal.

In the optical unit 61 according to this embodiment, an iris 83 is formed between the half mirror 81 and image sensor 64. An iris 84 is formed between the half mirror 81 and light source 82. Also, a wavelength filter 85 is formed between the half mirror 81 and iris 83.

To clean the coupling end face 203 of the optical connector plug 201 by using the optical connector cleaning tool 11 configured as described above, the cylindrical member 13 is first inserted into the adaptor 202 of the optical connector 200. Then, the case 7 is advanced toward the adaptor 202. When the case 7 thus advances, the pressing mechanism 28 operates, and the cleaning thread 24 cleans the coupling end face 203 by wiping it. More specifically, the cleaning tip 23 is pressed against the coupling end face 203 and rotated, and the cleaning thread 24 is fed, thereby cleaning the coupling end face 203.

After cleaning, the scope 3 captures an image of the coupling end face 203 in a state in which the adaptor 202 is attached to the cylindrical member 13. The image display device 4 displays the image of the coupling end face 203. The worker watching this image displayed on the image display device 4 can know the state of the coupling end face 203, and can determine whether cleaning is necessary.

If the worker determines that cleaning is necessary, he or she performs cleaning again by advancing the case 7 again without detaching the adaptor 202 from the cylindrical member 13. Note that the scope 3 can also be used before cleaning the optical connector plug 201. In this case, the worker can determine before cleaning whether the coupling end face 203 requires cleaning, so it is possible to prevent unnecessary cleaning from being performed on a clean coupling end face 203.

When using the optical connector cleaning tool 11 according to this embodiment, the cleaning tip 23 is moved close to the optical connector plug 201 in a state in which the optical connector plug 201 is connected to the cylindrical member 13 (a connecting portion). The coupling end face 203 can be cleaned by pressing the cleaning thread 24 against the coupling end face 203.

Also, the coupling end face 203 can be seen from the side of the image sensor 64 through the optical path of the optical unit 61. In addition, the optical connector cleaning tool 11 makes it possible to check the state of the coupling end face 203 before performing cleaning.

Furthermore, it is possible to perform cleaning and check the state of the coupling end face 203 in a state in which the optical connector plug 201 is connected to the cylindrical member 13 (a connecting portion). Accordingly, a high-workability optical connector cleaning tool can be provided. Also, when using the optical connector cleaning tool 11 according to this embodiment, the coupling end face 203 can be cleaned until no contamination is found. This improves the quality of installation and maintenance of the optical connector 200.

The optical connector end face observation system 1 according to this embodiment includes the cleaner 2 of the above-described optical connector cleaning tool 11, the scope 3 which captures an image of the coupling end face 203 by using the optical unit 61 of the optical connector cleaning tool 11, thereby generating the image of the coupling end face 203, and the image display device 4 which displays the image generated by the scope 3.

In the optical connector end face observation system 1 configured as described above, it is possible to portably integrate the cleaner 2, scope 3, and image display device 4, and notify the worker of the state of the coupling end face 203 of the optical connector plug 201 by the image display device 4. This makes it possible to readily check the coupling end face 203 before or after cleaning.

The optical unit 61 according to this embodiment includes the ring lens 16, and the image formation lens 63 positioned between the ring lens 16 and image sensor 64. The cleaner 2 includes the supply bobbin 36a for supplying the cleaning thread 24, and the winding bobbin 37a for winding the cleaning thread 24. In the longitudinal direction of the optical path 62 of the optical unit 61, the supply bobbin 36a and winding bobbin 37a are arranged in positions between the ring lens 16 and image formation lens 63, and adjacent to the optical path 62. The cleaning thread 24 crosses the optical path 62 of the optical unit 61.

In the confocal optical system, a high-resolution image can be propagated even if an obstacle exists in the central portion. Therefore, the optical connector cleaning tool 11 according to this embodiment can feed the cleaning thread 24 without deteriorating the image quality. Also, since the cleaning thread 24 is thus fed, cleaning can always be performed by using a new cleaning thread 24. Accordingly, this embodiment can provide an optical connector cleaning tool which can repetitively be used a plurality of times.

Furthermore, the optical connector cleaning tool 11 uses the confocal optical system. This facilitates alignment even when the ring lens 16 of the optical unit 61 is separated from the image formation lens 63 and connected again after that. That is, alignment is easy even when the cleaner 2 including the ring lens 16 is replaced.

The transparent member 26 is attached to the end portion of the cleaning tip 23 according to this embodiment, which is opposite to the optical connector plug 201. The transparent member 26 is connected to the pressing mechanism 28 which biases the cleaning tip 23 toward the optical connector plug 201 and rotates the cleaning tip 23.

In this embodiment, the pressing mechanism 28 can be connected to the cleaning tip 23 without deteriorating the image quality. Therefore, the cleaner 2 and optical unit 61 can be integrated.

The cleaner 2 according to this embodiment includes the first cylinder 12 projecting from one end portion of the case 7, and the second cylinder 31 which rotates in the first cylinder 12. Also, the cylindrical member 13 is formed in the distal end portion of the first cylinder 12. The fitting structures (the first, second, and third fitting structures 19, 40, and 48) each including the pair of tapered surfaces are respectively formed in the coupling portion between the case 7 and first cylinder 12, the coupling portion between the first and second cylinders 12 and 31, and the coupling portion between the first cylinder 12 and connecting portion.

As a consequence, the case 7, first cylinder 12, second cylinder 31, and cylindrical member 13 are automatically positioned on the same axis during observation. Accordingly, this embodiment can provide an optical connector cleaning tool capable of accurately capturing an image of the coupling end face 203.

The optical connector cleaning tool 11 according to this embodiment includes the slide mechanism 65 which changes the spacing between the image formation lens 63 and image sensor 64 by moving the image formation lens 63 with respect to the image sensor 64.

This makes it possible to focus the image formation lens 63 without changing the total length of the optical connector cleaning tool 11.

In this embodiment, the cleaner 2 and cylindrical member 13 form the front half portion (first unit) 7a, and the image formation lens 63 and image sensor 64 of the optical unit 61 form the rear half portion (second unit) 7b. The front half portion 7a is detachably attached to one end portion of the rear half portion 7b. The lens surface of the image formation lens 63 forms an optical connecting end face of the front half portion 7a and rear half portion 7b.

The inter-lens distance between the ring lens 16 and image formation lens 63 has no large influence on the image quality and image magnification. Therefore, no big problem arises even when a shift occurs in the optical-axis direction in the connection end face of the front half portion 7a and rear half portion 7b. Accordingly, this embodiment can provide an optical connector cleaning tool which facilitates replacing the cleaner 2 or front half portion 7a.

Also, in the optical connector cleaning tool 11 according to this embodiment, the optical path 62 in the rear half portion 7b can be sealed by using the image formation lens 63. Therefore, the optical connector cleaning tool 11 can prevent a foreign matter such as dust having entered the case 7 through the cleaner 2 from entering the optical path 62 of the rear half portion 7b.

The ring lens 16 according to this embodiment forms a guide when the cleaning tip 23 moves in the longitudinal direction.

This prevents buckling of the cleaning tip 23, and obviates the need for a dedicated member for guiding the cleaning tip 23 along the optical path 62. A member like this blocks the optical path 62.

Accordingly, this embodiment can provide an optical connector cleaning tool which allows the cleaning tip 23 to linearly move without buckling, while preventing a decrease in light amount or deterioration of the image quality caused when the optical path 62 is blocked.

The coupling end face 203 of the optical connector plug 201 connected to the cylindrical member 13 according to this embodiment is positioned at the focal point of the ring lens 16. The cleaning tip 23 is pressed against the coupling end face 203 by the spring force of the third compression coil spring 53.

This makes it possible to reliably clean the coupling end face 203 by the cleaning thread 24 while using the arrangement capable of capturing an image of the coupling end face 203 at a high resolution. Therefore, this embodiment can provide an optical connector cleaning tool having both a high image capturing performance and cleaning performance.

The optical connector cleaning tool 11 according to this embodiment includes the half mirror 81 positioned on the optical path 62 of the optical unit 61 and in the vicinity of the image sensor 64, and the light source 82 positioned near the half mirror 81.

The half mirror 81 guides the light of the light source 82 to the optical connector plug 201, and guides the light from the optical connector plug 201 to the image sensor 64. The light source 82 and image sensor 64 are arranged in conjugate positions in the confocal optical system with respect to the ring lens 16.

Since the image capturing surface of the image sensor 64 and the light source 82 can be arranged close to each other, therefore, the power supplies (not shown) of these electronic parts can be integrated. Accordingly, the optical connector cleaning tool 11 can be downsized although the light source 82 is included.

In the optical connector cleaning tool 11 according to this embodiment, the iris 83 is formed between the image sensor 64 and half mirror 81. In this embodiment, therefore, unnecessary stray light which does not pass through a normal path can be removed by the iris 83, so the image quality can be improved.

Also, in the optical connector cleaning tool 11 according to this embodiment, the wavelength filter 85 is formed between the image sensor 64 and half mirror 81.

Accordingly, light rays at an angle which is not a normal path can be removed by using the dependence of the filter transmittance on the angle, so the image quality improves. It is also possible to improve a blur caused by chromatic aberration.

Furthermore, in the optical connector cleaning tool 11 according to this embodiment, the iris 84 is formed between the light source 82 and half mirror 81.

This makes it possible to remove unnecessary light entering the half mirror 81 by the iris 84. Therefore, the image quality improves because it is possible to reduce stray light which propagates after being reflected by the wall surface of the lens barrel (66, 67, 31, 14, and 15), and enters the image sensor 64, reduce stray light which enters the image sensor 64 after being transmitted through the half mirror 81, reflected from the inner wall surface (the surface against which the stray light collides after being transmitted through the half mirror) of the case, which opposes the light source 82 with the half mirror 81 being sandwiched between them, and then reflected by the surface of the half mirror 81, and reduce stray light which enters the image sensor 64 after being reflected by the rear surface of the half mirror 81, and then reflected by the front surface thereof.

(Another Embodiment of Connecting Portion)

Figure 13A:
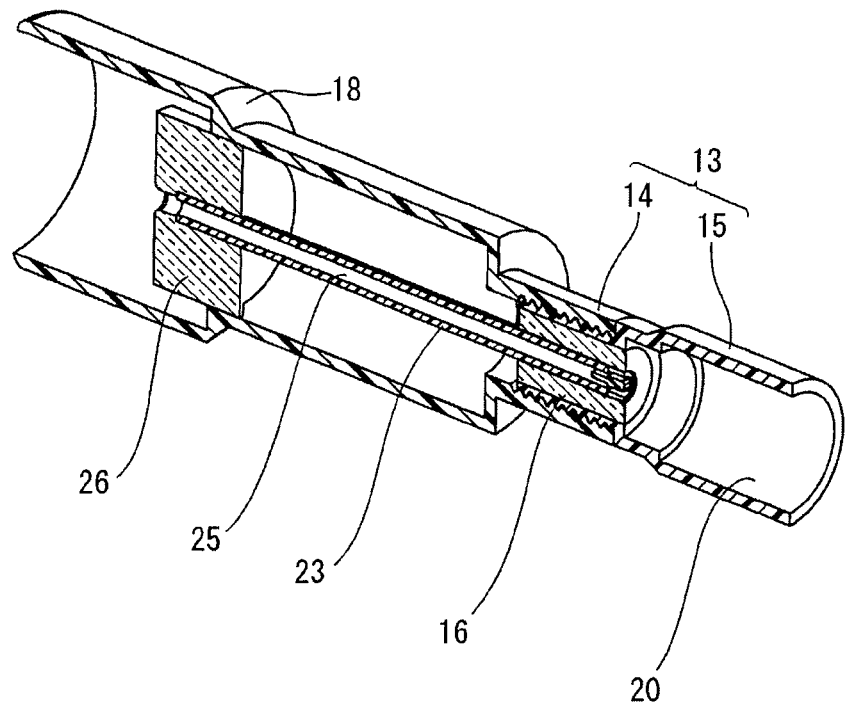
FIG. 13A is a sectional view showing another embodiment of a ring lens mounting structure in a state in which a ring lens is mounted.
Figure 13B:
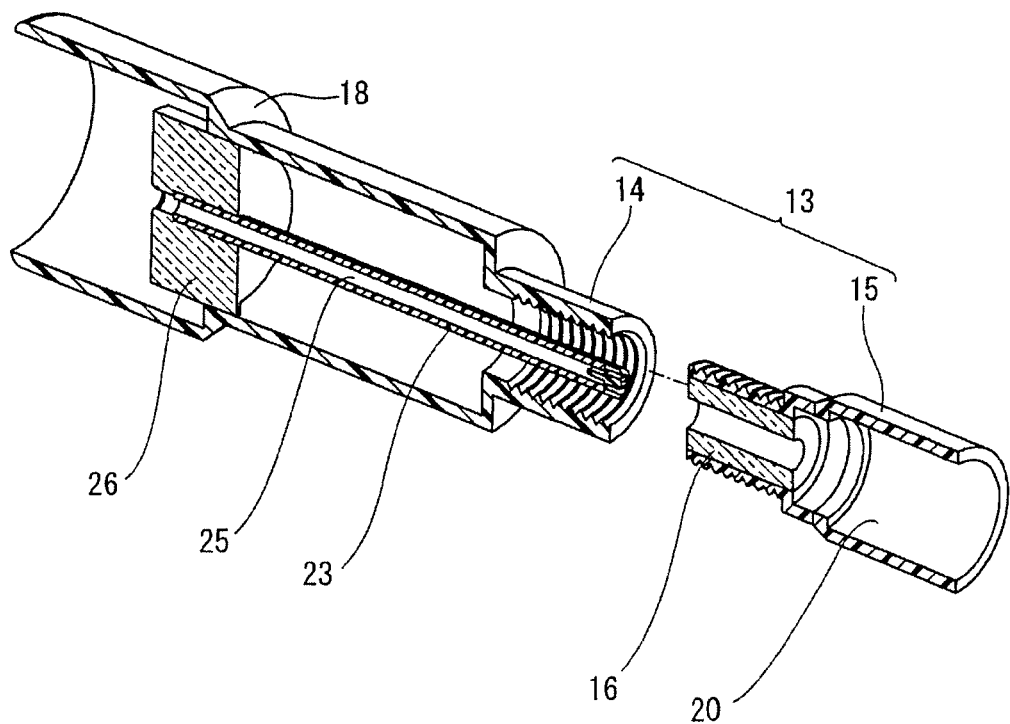
FIG. 13B is a sectional view showing the other embodiment of the ring lens mounting structure in a state in which the ring lens is removed.

The ring lens 16 according to the above-described embodiment is attached to the proximal-end member 14 of the cylindrical member 13. As shown in FIGS. 13A and 13B, however, the ring lens 16 can be attached to the distal-end member 15 of the cylindrical member 13. The same reference numerals as in FIGS. 1 to 12 denote the same or equivalent members in FIGS. 13A and 13B, and a detailed explanation will be omitted as needed.

The distal-end member 15 according to this embodiment is screwed on the inner circumferential portion of the proximal-end member 14. The ring lens 16 is fixed to the inner circumferential portion of the distal-end member 15. That is, the ring lens 16 according to this embodiment is detachably attached to the cylindrical member 13 (the connecting portion).

Accordingly, the ring lens 16 can be reused even when replacing the cleaner 2 or front half portion 7a. Therefore, this embodiment can provide an optical connector cleaning tool capable suppressing the cost of a replacement part.

(Other Embodiments of Optical Unit)

Modifications of the optical unit formed in the optical connector cleaning tool according to the present invention will be explained in detail below with reference to FIGS. 14 to 22. The same reference numerals as in FIGS. 1 to 12 denote the same or equivalent members in FIGS. 14 to 22, and a detailed explanation will be omitted as needed.

Figure 14:
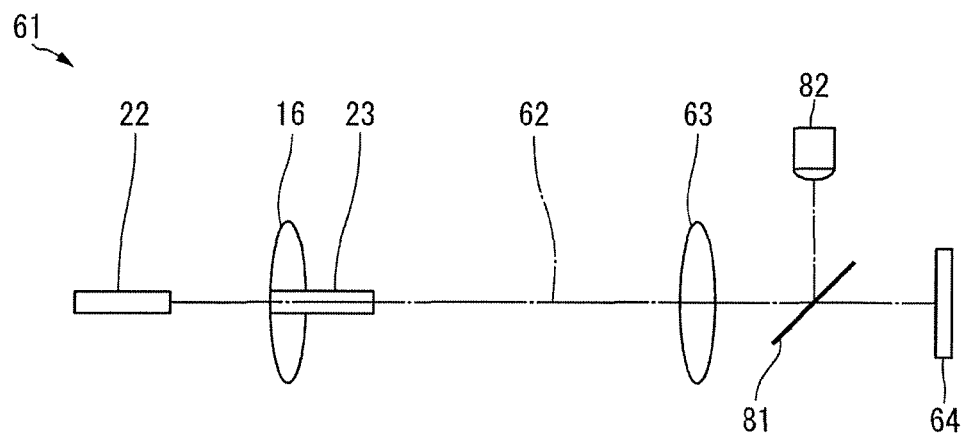
FIG. 14 is a side view showing another embodiment of the optical unit.

In the optical unit 61 shown in FIG. 14, the half mirror 81 is formed between the image formation lens 63 and image sensor 64. Also, the light source 82 is formed near the half mirror 81. The light source 82 and image sensor 64 are arranged in conjugate positions in the confocal optical system with respect to the ring lens 16. That is, the distance between the half mirror 81 and image sensor 64 and that between the half mirror 81 and light source 82 are equal.

The optical unit 61 does not include members such as an iris and wavelength filter.

In this embodiment, the image capturing surface and light source 82 can be arranged close to each other, so the power supplies (not shown) connected to the light source 82 and image sensor 64 can be integrated.

Figure 15:
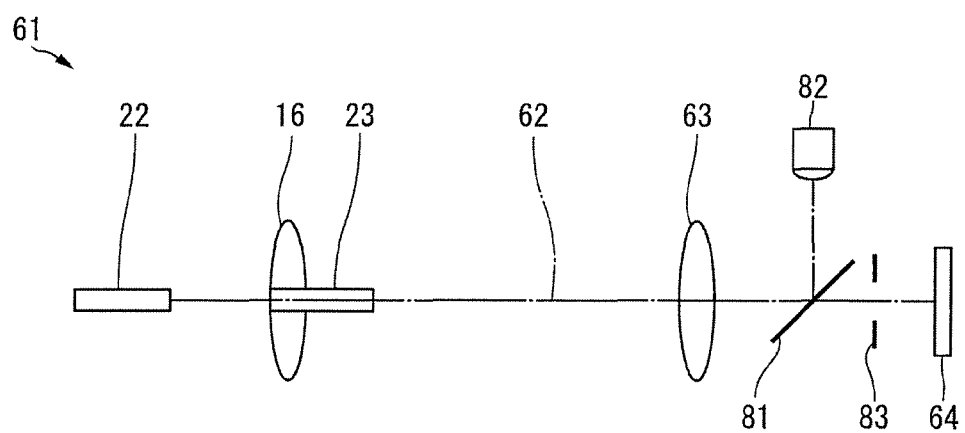
FIG. 15 is a side view showing still another embodiment of the optical unit.

The optical unit 61 shown in FIG. 15 includes not only the half mirror 81 and light source 82, but also the iris 83. The iris 83 is arranged between the half mirror 81 and image sensor 64.

In this embodiment, unnecessary stray light which is not a normal path can be removed, so the quality of an image generated by the image sensor 64 improves.

Figure 16:
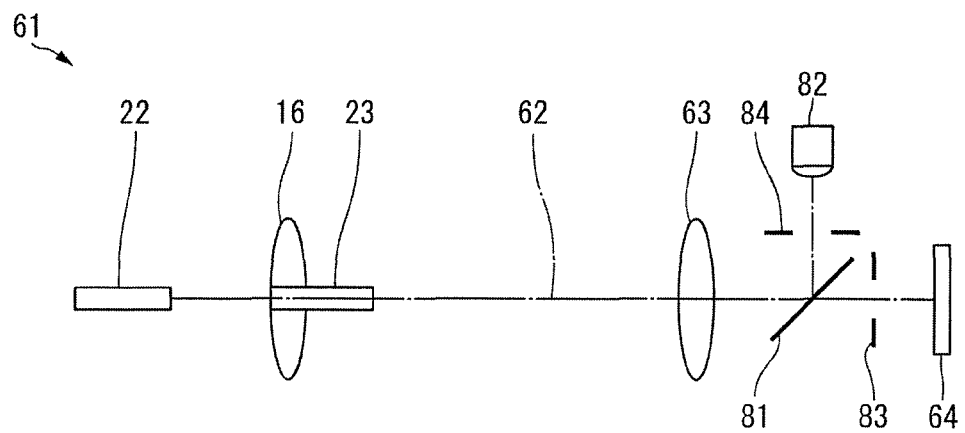
FIG. 16 is a side view showing still another embodiment of the optical unit.

In the optical unit 61 shown in FIG. 16, the iris 84 is formed between the half mirror 81 and light source 82. The rest of the arrangement is equivalent to that of the optical unit 61 shown in FIG. 15. In this embodiment, unnecessary light entering the half mirror 81 can be removed by the iris 84. This makes it possible to reduce stray light which propagates after being reflected by the wall surface of the lens barrel (66, 67, 31, 14, and 15), and enters the image sensor 64, reduce stray light which enters the image sensor 64 after being transmitted through the half mirror 81, reflected from the inner wall surface (the surface against which the stray light collides after being transmitted through the half mirror) of the case, which opposes the light source 82 with the half mirror 81 being sandwiched between them, and then reflected by the surface of the half mirror 81, and reduce stray light which enters the image sensor 64 after being reflected by the rear surface of the half mirror 81, and then reflected by the front surface thereof. Accordingly, it is possible to further improve the quality of an image generated by the image sensor 64.

Figure 17:
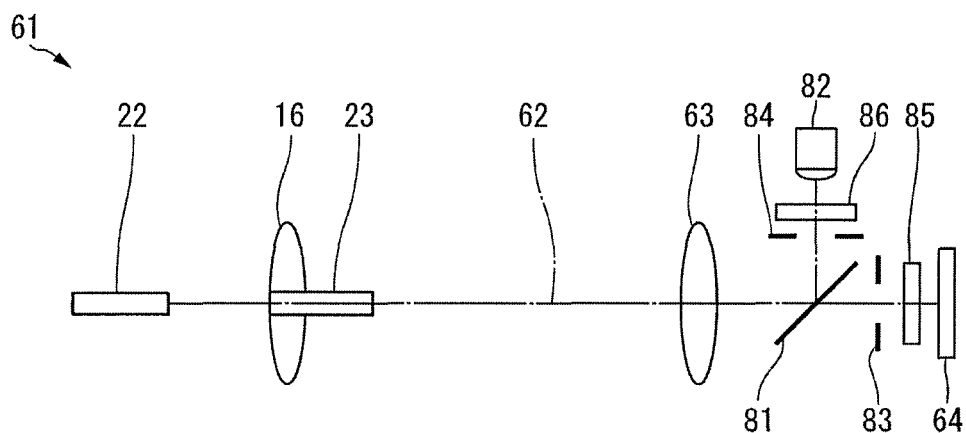
FIG. 17 is a side view showing still another embodiment of the optical unit.

The optical unit 61 shown in FIG. 17 includes a wavelength filter 86 between the light source 82 and iris 84. The rest of the arrangement is equivalent to that of the optical unit 61 shown in FIG. 11.

In this embodiment, it is possible to remove light rays at an angle which is not a normal path by using the dependence which the wavelength filter 86 positioned between the light source 82 and iris 84 has on an angle. Therefore, this embodiment further improves the quality of an image captured by the image sensor 64. In addition, a blur caused by chromatic aberration further improves.

Note that when using the wavelength filter, it is possible to place the wavelength filter near both the light source 82 and image sensor 64 as shown in FIG. 17, place the wavelength filter near only the image sensor 64 as shown in FIG. 11, or place the wavelength filter near only the light source 82 although not shown.

Figure 18:
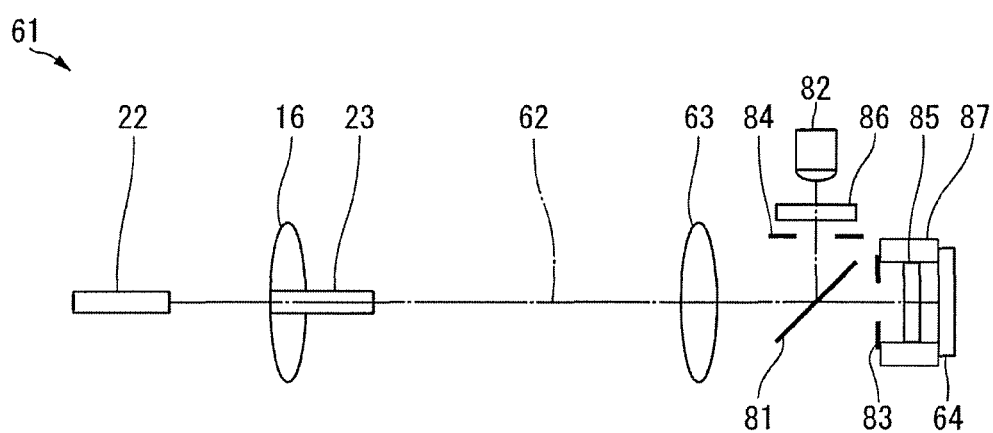
FIG. 18 is a side view showing still another embodiment of the optical unit.

The optical unit 61 shown in FIG. 18 includes a light-shielding wall 87 surrounding the optical path 62 in the vicinity of the image sensor 64. The light-shielding wall 87 is formed by a non-transparent material. The rest of the arrangement is equivalent to that of the optical unit 61 shown in FIG. 17.

In this embodiment, it is possible to prevent unnecessary light from entering the image sensor 64 by the light-shielding wall 87. This improves the quality of an image captured by the image sensor 64.

Figure 19:
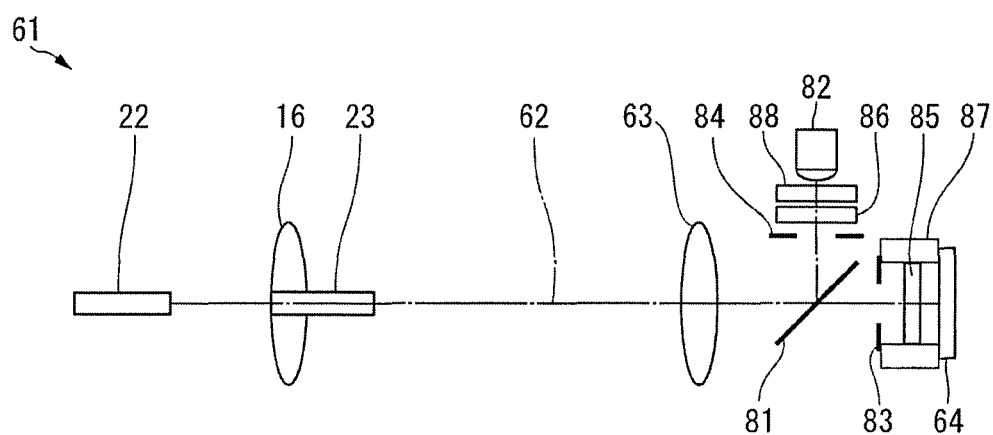
FIG. 19 is a side view showing still another embodiment of the optical unit.

The optical unit 61 shown in FIG. 19 includes a polarization filter 88 between the light source 82 and wavelength filter 86. The rest of the arrangement is equivalent to that of the optical unit 61 shown in FIG. 18.

The reflectance from the transmitting surface of the half mirror 81 depends on the polarization direction. In this embodiment, only a low-reflectance polarized wave can be used as the light of the light source 82, so stray light reduces. As a consequence, the quality of an image captured by the image sensor 64 improves.

Figure 20:
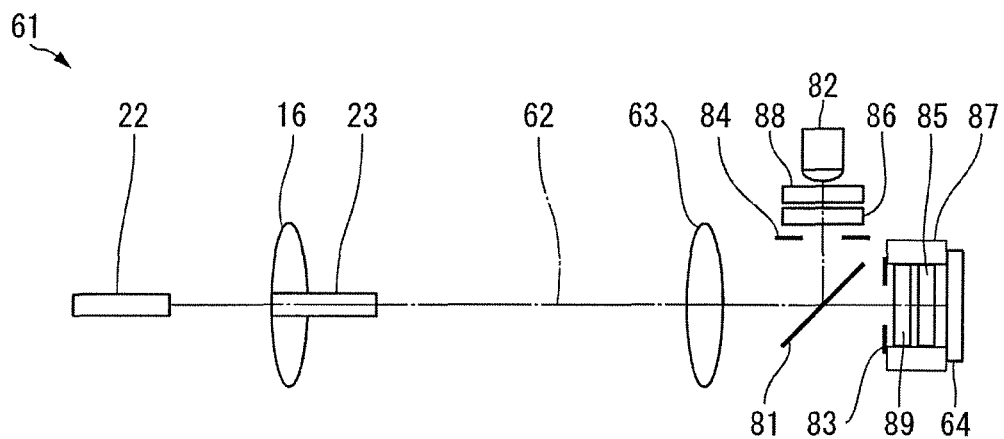
FIG. 20 is a side view showing still another embodiment of the optical unit.

The optical unit 61 shown in FIG. 20 includes a polarization filter 89 near the image sensor 64 and between the iris 83 and wavelength filter 85. The rest of the arrangement is equivalent to that of the optical unit 61 shown in FIG. 19.

In this embodiment, only a low-reflectance polarized wave can be used as light entering the image sensor 64, so stray light reduces. Consequently, the quality of an image captured by the image sensor 64 improves.

As shown in FIGS. 14 to 17, 19, and 20, in the optical connector cleaning tool 11 according to the present invention, at least one of the iris 83, wavelength filter 85, and polarization filter 89 can be formed between the image sensor 64 and half mirror 81. Also, in the optical connector cleaning tool 11 according to the present invention, at least one of the iris 84, wavelength filter 86, and polarization filter 88 can be formed between the light source 82 and half mirror 81.

Figure 21:
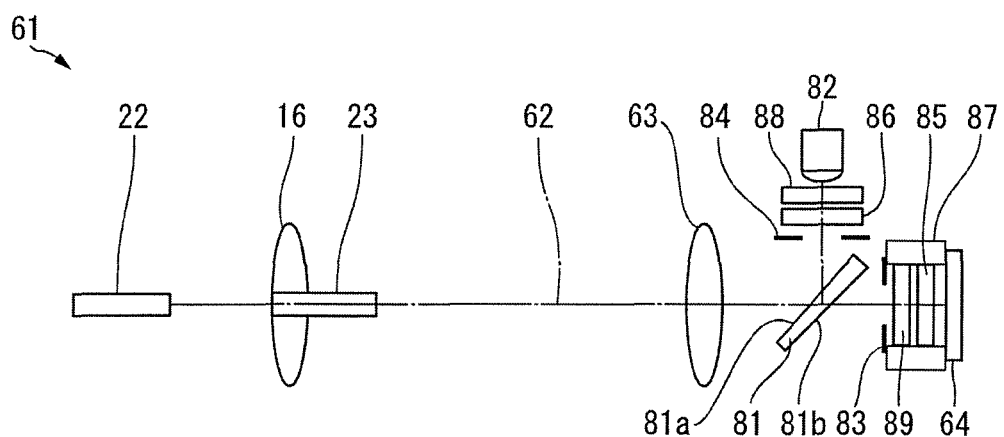
FIG. 21 is a side view showing still another embodiment of the optical unit.

In the optical unit 61 shown in FIG. 21, a reflecting surface 81a and transmitting surface 81b of the half mirror 81 are nonparallel. The rest of the arrangement is equivalent to that of the optical unit 61 shown in FIG. 20.

In this embodiment, it is possible to reduce reflected light from a surface for which reflection of the half mirror 81 is not assumed. Since this embodiment can remove unnecessary stray light, therefore, the quality of an image captured by an image sensor improves.

Figure 22:
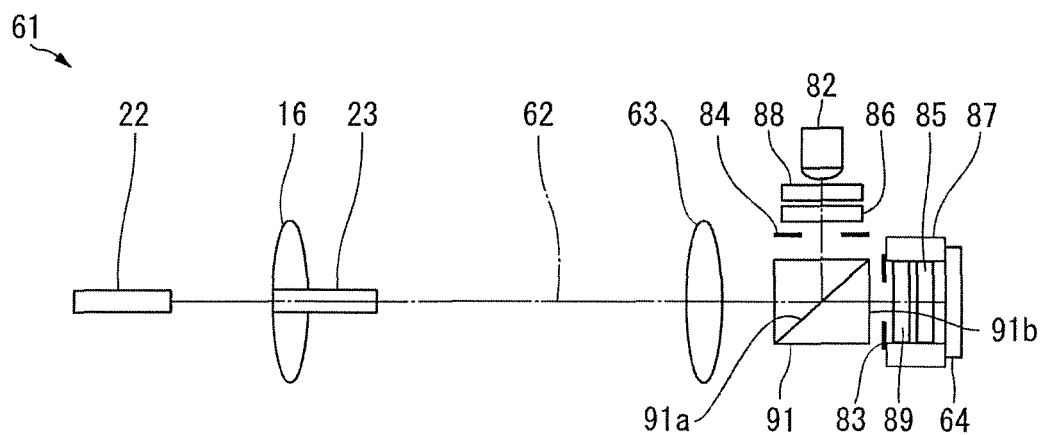
FIG. 22 is a side view showing still another embodiment of the optical unit.

The optical unit 61 shown in FIG. 22 uses a cubic beam splitter 91 instead of the half mirror 81. The optical unit 61 includes the cubic beam splitter 91 positioned on the optical path 62 and near the image sensor 64, and the light source 82 positioned near the cubic beam splitter 91. The cubic beam splitter 91 guides the light of the light source 82 to the optical connector plug 201, and guides the light from the optical connector plug 201 to the image sensor 64. Also, the relative angle between a reflecting surface 91a and transmitting surface 91b of the cubic beam splitter 91 is not 45°.

The light source 82 and image sensor 64 are arranged in conjugate positions in the confocal optical system with respect to the ring lens 16 in this embodiment as well. The rest of the arrangement is equivalent to that of the optical unit 61 shown in FIG. 21.

This embodiment reduces reflected light from a surface for which reflection of the cubic beam splitter 91 is not assumed. Since this embodiment can remove unnecessary stray light, therefore, the quality of an image captured by the image sensor 64 improves.

At least one of the iris 83, wavelength filter 85, and polarization filter 89 can be formed between the image sensor 64 and cubit beam splitter 91 in the optical unit 61 using the cubic beam splitter 91 as well. It is also possible to form at least one of the iris 84, wavelength filter 86, and polarization filter 88 between the light source 82 and cubic beam splitter 91.

In addition, even when using the cubic beam splitter 91, the light-shielding wall 87 as shown in FIG. 18 can be used.

(Other Embodiments of Optical Connector End Face Observation System)

The optical connector end face observation system using the above-described optical connector cleaning tool can be configured as shown in FIGS. 23 to 29. The same reference numerals as in FIGS. 1 to 22 denote the same or equivalent members in FIGS. 23 to 29, and a detailed explanation will be omitted as needed.

Figure 23:
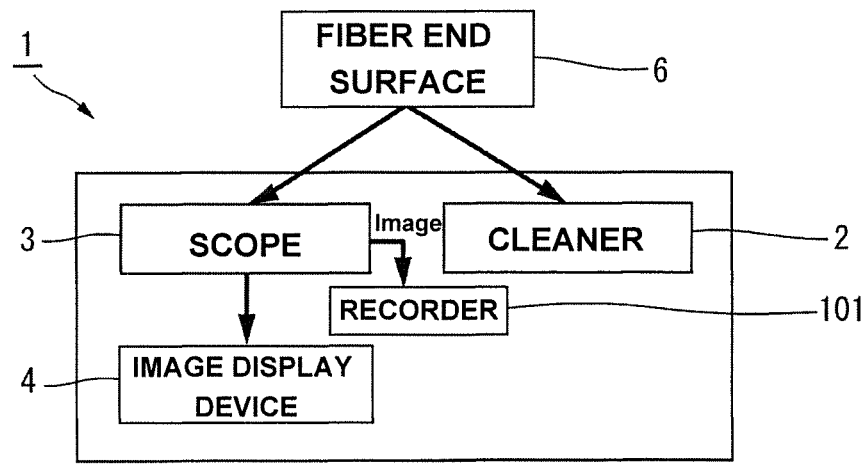
FIG. 23 is a block diagram showing another embodiment of the optical connector end face observation system.

The optical connector end face observation system 1 shown in FIG. 23 includes a recorder 101 which records an image generated by the scope 3.

In this embodiment, images recorded in the recorder 101 can be checked later, so it is possible to perform work check, cause analysis, and determination by statistical data.

Figure 24:
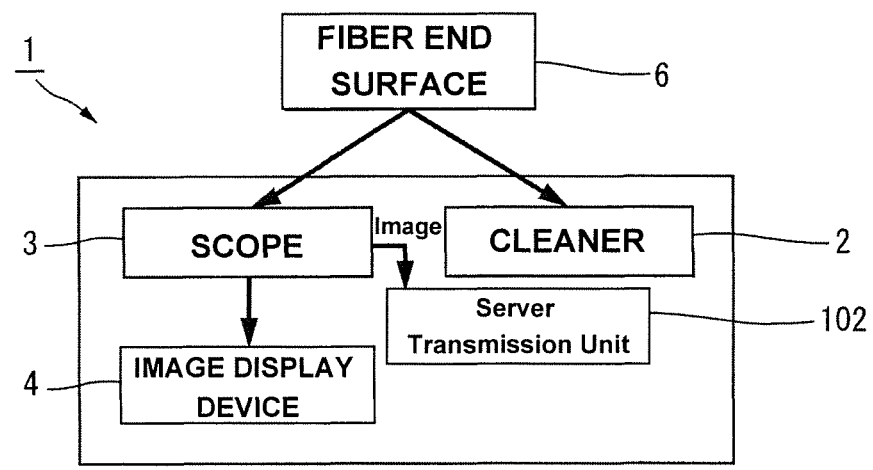
FIG. 24 is a block diagram showing still another embodiment of the optical connector end face observation system.

The optical connector end face observation system 1 shown in FIG. 24 includes a server transmission unit 102 which transmits an image generated by the scope 3 to a server (not shown).

In this embodiment, images transmitted to the server can be checked later, so it is possible to perform work check, cause analysis, and determination by statistical data. Note that even the system including the server transmission unit 102 as in this embodiment can include the recorder 101 as shown in FIG. 23.

Figure 25:
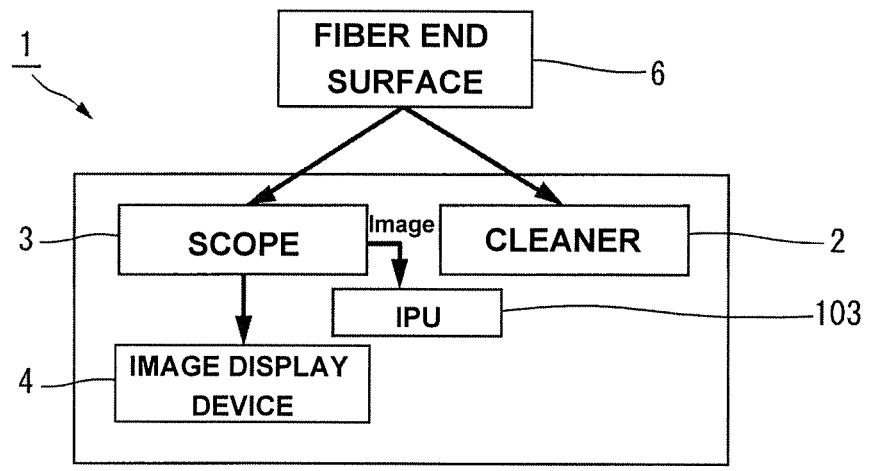
FIG. 25 is a block diagram showing still another embodiment of the optical connector end face observation system.

The optical connector end face observation system 1 shown in FIG. 25 includes an IPU (Image Processing Unit) 103 which extracts the position and size of contamination in the image generated by the scope 3, and determines the presence/absence of contamination.

In this embodiment, the presence/absence of contamination can automatically be determined by the IPU 103. Since this improves the reproducibility of work, the working time can be shortened.

Figure 26:
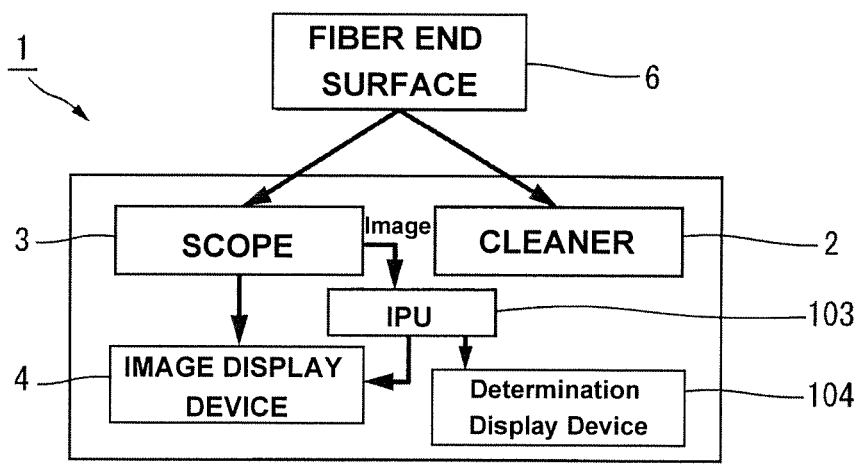
FIG. 26 is a block diagram showing still another embodiment of the optical connector end face observation system.

In the optical connector end face observation system 1 shown in FIG. 26, the determination result of the IPU 103 is displayed on the image display device 4 or a dedicated determination display device 104.

In this embodiment, the IPU 103 automatically determines the presence/absence of contamination, and the image display device 4 or determination display device 104 displays the determination result. This improves the reproducibility of work, so the working time can be shortened.

Figure 27:
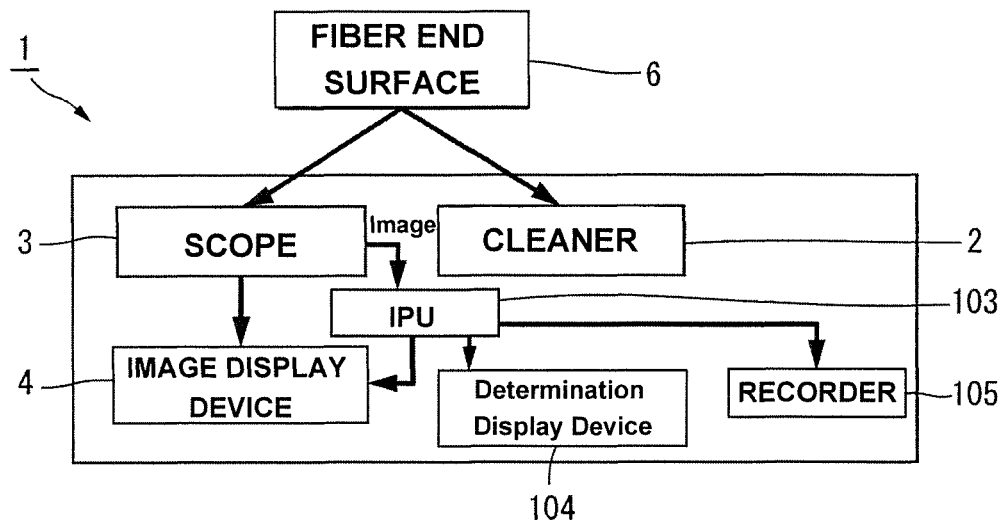
FIG. 27 is a block diagram showing still another embodiment of the optical connector end face observation system.

The optical connector end face observation system 1 shown in FIG. 27 includes a recorder 105 which records the determination result of the IPU 103.

In this embodiment, the determination result of the IPU 103 can be checked later by reading out the determination result from the recorder 105. This makes it possible to perform work check, cause analysis, and determination by statistical data.

Figure 28:
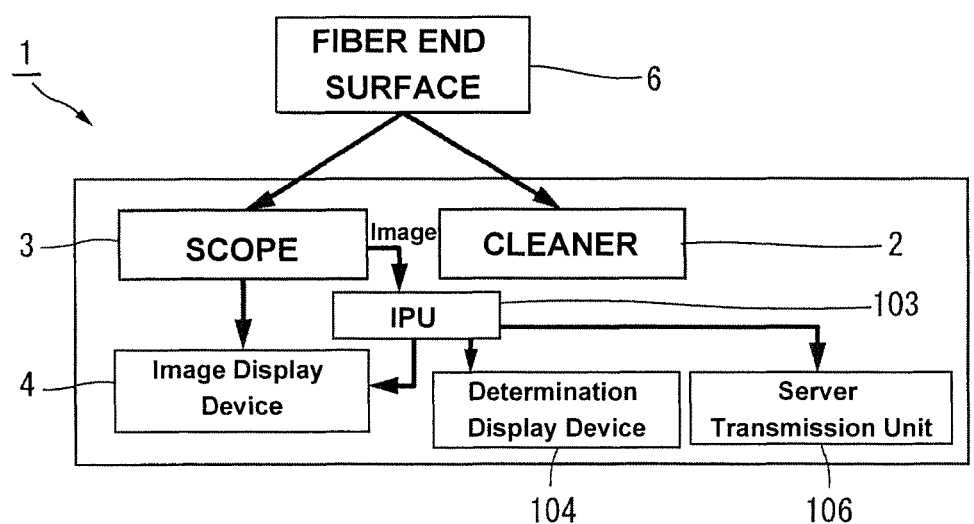
FIG. 28 is a block diagram showing still another embodiment of the optical connector end face observation system.

The optical connector end face observation system 1 shown in FIG. 28 includes a server transmission unit 106 which transmits the determination result of the IPU 103 to a server.

In this embodiment, the determination result of the IPU 103 can be checked later by reading out the determination result from the server. Accordingly, it is possible to perform work check, cause analysis, and determination by statistical data. Note that even this embodiment can include the recorder 105 as shown in FIG. 27.

Figure 29:
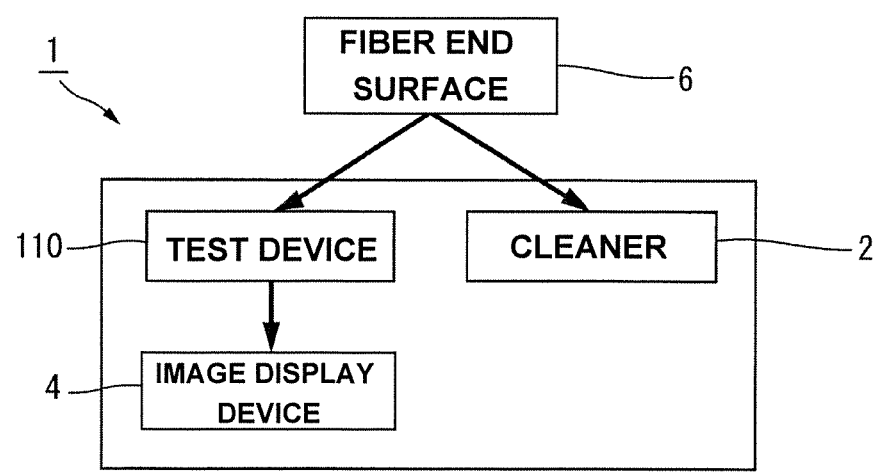
FIG. 29 is a block diagram showing still another embodiment of the optical connector end face observation system.

The optical connector end face observation system 1 shown in FIG. 29 includes the cleaner 2, a test device 110, and the image display device 4. The cleaner 2 is used in the optical connector cleaning tool 11 shown in FIGS. 1 to 22.

The test device 110 tests the optical connector plug 201 based on data obtained by the optical unit 61 of the optical connector cleaning tool 11. This test obtains the test results of, e.g., live wire determination, the presence/absence of contamination, and signal characteristics. The signal characteristics to be tested are the power, wavelength, PDL, and the like.

The image display device 4 displays the test results of the test device 110.

In this embodiment, it is possible to portably integrate the cleaner 2, test device 110, and image display device 4, and notify the worker of the results of tests conducted on the optical connector plug 201 by the image display device 4. Therefore, an optical connector end face observation system capable of readily checking the test results before or after cleaning can be provided.

Note that even the arrangement shown in FIG. 29 can include a recorder (not shown) for recording the test results, or a server transmission unit (not shown) for transmitting the test results to a server.

(Another Embodiment of Support Member)

Figure 30A:
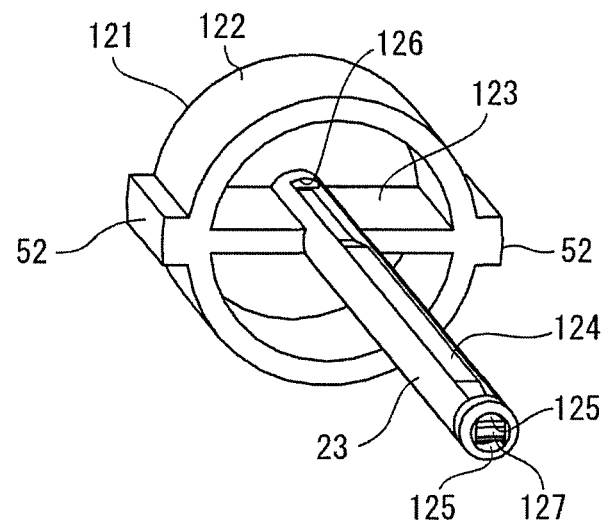
FIG. 30A is a perspective view showing a state in which another embodiment of a support member is viewed from a diagonal front side.
Figure 30B:
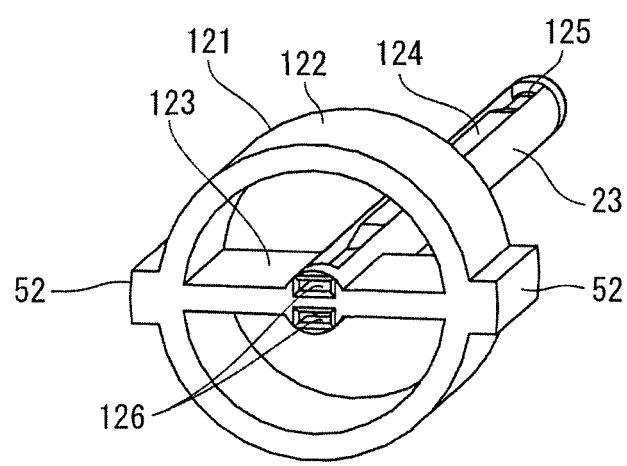
FIG. 30B is a perspective view showing a state in which the other embodiment of the support member is viewed from a diagonal back side.

The support member for supporting the cleaning tip can be formed as shown in FIGS. 30A and 30B. The same reference numerals as in FIGS. 1 to 12 denote the same or equivalent members in FIGS. 30A and 30B, and a detailed explanation will be omitted as needed.

A support body 121 is formed in the rear end portion of the cleaning tip 23 shown in FIGS. 30A and 30B. In this embodiment, the support body 121 forms "a support member" in the invention described in claim 3.

The support body 121 includes a main body 122 formed into a cylindrical shape, and a coupling plate 123 formed in the main body 122. The main body 122 is formed into a shape which movably fits in the front end portion (see FIG. 8) of the second cylinder 31. The projections 52 which fit in the slits 51 of the second cylinder 31 are formed on the outer circumferential portion of the main body 122 formed into a cylindrical shape.

The coupling plate 123 crosses the interior of the main body 122 in the radial direction, and connects the rear end portion of the cleaning tip 23 and the main body 122. A space formed inside the main body 122 functions as a part of the optical path.

The cleaning tip 23 according to this embodiment has guide grooves 124 for passing the cleaning thread (not shown). The guide grooves 124 are formed on the two sides of the cleaning tip 23 in the radial direction. As shown in FIG. 30A, the front end portions of the guide grooves 124 are communicated with a front space via front guide holes 125 in in these grooves formed in the front end portion of the cleaning tip 23. As shown in FIG. 30B, the rear end portions of the guide grooves 124 are communicated with a rear space via rear guide holes 126 in these grooves formed in the rear end portion of the cleaning tip 23.

The cleaning thread is guided from the rear space to the front space through one rear guide hole 126, one guide groove 124, and one front guide hole 125. This cleaning thread is then returned at a front end 127 of the cleaning tip 23, and guided to the rear space through the other front guide hole 125, the other guide groove 124, and the other rear guide hole 126. The cleaning thread is guided behind the cleaning tip 23 through the grooves 124 and holes 125.

Each of the above-described embodiments has disclosed an example in which the ring lens 16 is used in the front end portion of the optical unit 61. However, the present invention is not limited to this example. That is, as the lens formed in the front end portion of the optical unit 61, any lens can be used as long as the lens has a missing portion extending in the optical-axis direction.

Each of the above-described embodiments has disclosed an example in which the system includes the slide mechanism 65 for changing the position of the image formation lens 63. However, the optical axis can be adjusted by moving the ring lens 16. In this case, the system includes a slide mechanism (not shown) which changes the spacing between the ring lens 16 and the coupling end face 203 of the optical connector plug 201 by moving the ring lens 16 with respect to the coupling end face 203.

The optical connector cleaning tool 11 disclosed in each of the above-described embodiments is used by attaching the cylindrical member 13 (the connecting portion) to the adaptor 202 of the optical connector 200. However, the present invention is not limited to this, and any part forming the optical connector, such as the adaptor or optical connector plug, can be connected to the cylindrical member 13 as the connecting portion. It is also possible to attach a connecting member for an optical connector plug to the distal end portion of the cylindrical member 13, and connect the optical connector plug 201 to this connecting member. In this case, one end portion of the connecting member can be attached by, e.g., fitting to the distal end portion of the cylindrical member 13. The other end portion of the connecting member can have a function of allowing fitting of the optical connector plug 201, and a function of positioning the coupling end face 203 in a predetermined focal position. When preparing this connecting member for each type of optical connector plug, one optical connector cleaning tool 11 can clean various optical connector plugs. It is also possible to clean not only an optical connector plug but also a stub in a receptacle of an optical module or the like.

What is claimed is:

1. An optical connector cleaning tool comprising:
   a cylindrical connecting portion to which an optical connector is connected;
   a cleaning unit configured to guide a cleaning thread to a coupling end face of an optical connector plug; and
   an optical unit having an optical path reaching said optical connector plug,
   wherein said optical unit comprises:
   a lens arranged in a position facing the coupling end face to form one end portion of an optical system, and said lens having a missing portion extending in an optical-axis direction; and
   an image sensor positioned at the other end of said optical system,
   said cleaning unit comprises a rod-like cleaning tip having a thread passage through which said cleaning thread passes, and
   said cleaning tip is inserted into an opening formed by said missing portion, such that said cleaning tip is movable in a longitudinal direction thereof.

2. The tool according to claim 1, wherein said optical unit further comprises an image formation lens positioned between said image sensor and said lens having the missing portion extending in the optical-axis direction,
   said cleaning unit further comprises:
   a supply mechanism configured to supply said cleaning thread; and
   a winding mechanism configured to wind said cleaning thread,
   said supply mechanism and said winding mechanism are arranged in positions adjacent to the optical path, and
   said cleaning thread crosses the optical path of said optical unit.

3. The tool according to claim 1, wherein said cleaning unit further comprises:
   a support member attached to an end portion of said cleaning tip, which is opposite to said optical connector plug, and configured to support said cleaning tip; and
   a pressing mechanism connected to said support member, and configured to bias said cleaning tip toward said optical connector plug and rotate said cleaning tip.

4. The tool according to claim 1, further comprising a case in which said cleaning unit is assembled,
   wherein said cleaning unit comprises a first cylinder projecting from one end portion of said case, and a second cylinder configured to rotate in said first cylinder,
   said connecting portion is formed in a distal end portion of said first cylinder, and
   the optical connector cleaning tool further comprises, as a fitting structure, a pair of tapered surfaces formed in each of a coupling portion between said case and said first cylinder, a coupling portion between said first cylinder and said second cylinder, and a coupling portion between said first cylinder and said connecting portion.

5. The tool according to claim 2, further comprising a slide mechanism configured to change a spacing between said image formation lens and said image sensor by moving said image formation lens with respect to said image sensor.

6. The tool according to claim 1, further comprising a slide mechanism configured to change a spacing between said lens having the missing portion extending in the optical-axis direction and the coupling end face of said optical connector plug by moving the lens having the missing portion extending in the optical-axis direction with respect to the coupling end face of said optical connector plug.

7. The tool according to claim 2, wherein said connecting portion and said cleaning unit form a first unit,
   said image formation lens and said image sensor form a second unit,
   said first unit is detachably attached to one end portion of said second unit, and
   a lens surface of said image formation lens forms an optical connecting end face between said first unit and said second unit.

8. The tool according to claim 1, wherein said lens having the missing portion extending in the optical-axis direction forms a guide when said cleaning tip moves in the longitudinal direction.

9. The tool according to claim 1, wherein the coupling end face of said optical connector plug connected to said connecting portion is positioned in a focal point of said lens having the missing portion extending in the optical-axis direction, and
said cleaning unit includes a spring member configured to press said cleaning tip against the coupling end face.

10. The tool according to claim 1, wherein said lens having the missing portion extending in the optical-axis direction is detachably attached to said connecting portion.

11. The tool according to claim 1, wherein said optical unit further comprises:
a parallel-plate beam splitter positioned on the optical path of said optical unit and near said image sensor; and
a light source positioned near said parallel-plate beam splitter,
said parallel-plate beam splitter is configured to guide light of said light source to said optical connector plug, and guide light from said optical connector plug to said image sensor, and
said light source and said image sensor are arranged in conjugate positions in a confocal optical system with respect to said lens having the missing portion extending in the optical-axis direction.

12. The tool according to claim 11, wherein said optical unit further comprises at least one of an iris, a wavelength filter, and a polarization filter between said image sensor and said parallel-plate beam splitter.

13. The tool according to claim 11, wherein said optical unit further comprises at least one of an iris, a wavelength filter, and a polarization filter between said light source and said parallel-plate beam splitter.

14. The tool according to claim 11, wherein a reflecting surface and a transmitting surface of said parallel-plate beam splitter are nonparallel.

15. The tool according to claim 1, wherein said optical unit further comprises:
a cubic beam splitter positioned on the optical path of said optical unit and near said image sensor; and
a light source positioned near said cubic beam splitter,
said cubic beam splitter is configured to guide light of said light source to said optical connector plug, and guide light from said optical connector plug to said image sensor, and
said light source and said image sensor are arranged in conjugate positions in a confocal optical system with respect to said lens having the missing portion extending in the optical-axis direction.

16. The tool according to claim 15, wherein said optical unit further comprises at least one of an iris, a wavelength filter, and a polarization filter between said image sensor and said cubic beam splitter.

17. The tool according to claim 15, wherein said optical unit further comprises at least one of an iris, a wavelength filter, and a polarization filter between said light source and said cubic beam splitter.

18. The tool according to claim 1, wherein said optical unit further comprises a light-shielding wall made of a nontransparent material and configured to surround the optical path of said optical unit in the vicinity of said image sensor.

19. An optical connector end face observation system comprising:
an optical connector cleaning tool cited in claim 1;
a test device configured to test an optical connector plug based on data obtained by said optical unit of said optical connector cleaning tool; and
a display device configured to display a test result of said test device.

20. An optical connector end face observation system comprising:
an optical connector cleaning tool cited in claim 1;
a scope configured to capture an image of the coupling end face by using an optical unit of said optical connector cleaning tool, thereby generating the image of the coupling end face; and
an image display device configured to display the image generated by said scope.

21. The system according to claim 20, further comprising a recorder configured to record the image generated by said scope.

22. The system according to claim 20, further comprising a server transmission unit configured to transmit the image generated by said scope to a server.

23. The system according to claim 20, further comprising an image processing unit configured to extract a position and size of contamination in the image generated by said scope, and determines the presence/absence of contamination.

24. The system according to claim 23, wherein said image processing unit causes a display device to display a determination result of said image processing unit.

25. The system according to claim 23, further comprising a recorder configured to record a determination result of said image processing unit.

26. The system according to claim 23, further comprising a server transmission unit configured to transmit a determination result of said image processing unit to a server.

27. The tool according to claim 1, wherein said lens having the missing portion extending in optical-axis direction is a ring lens.

* * * * *